(12) United States Patent
Ikeda

(10) Patent No.: US 8,678,763 B2
(45) Date of Patent: Mar. 25, 2014

(54) CIRCULAR RING, ROTATING DUCT, SHROUD, TRUNK AND CYLINDRICAL EXTERNAL WALL PREPARED BY LAMINATION OF SHEET BELT, AND APPARATUS AND METHOD FOR PREPARING THE SAME

(76) Inventor: Kaidou Ikeda, Nishitokyo (JP)

( * ) Notice: Subject to any disclaimer, the term of this patent is extended or adjusted under 35 U.S.C. 154(b) by 718 days.

(21) Appl. No.: 12/918,847

(22) PCT Filed: Feb. 22, 2008

(86) PCT No.: PCT/JP2008/053040
§ 371 (c)(1),
(2), (4) Date: Aug. 23, 2010

(87) PCT Pub. No.: WO2009/104270
PCT Pub. Date: Aug. 27, 2009

(65) Prior Publication Data
US 2011/0002773 A1 Jan. 6, 2011

(51) Int. Cl.
*B23P 19/04* (2006.01)
(52) U.S. Cl.
USPC .............................. 415/232; 29/439
(58) Field of Classification Search
USPC ................ 415/2.1, 3.1, 4.1, 4.2, 4.3, 4.4, 4.5, 415/173.1, 173.6, 182.1, 200, 219.1, 220, 415/227, 228, 232; 29/439, 525.01, 894.2, 29/897.2; 428/457, 625, 626
See application file for complete search history.

(56) References Cited

U.S. PATENT DOCUMENTS

| 7,503,747 B2 | 3/2009 | Ikeda |
| 2006/0063022 A1* | 3/2006 | Joannes Marie Meuwissen et al. ............................ 428/615 |

(Continued)

FOREIGN PATENT DOCUMENTS

| JP | 47-29103 B | 7/1972 |
| JP | 50-53258 A | 5/1975 |

(Continued)

OTHER PUBLICATIONS

"Success in Development of Fast Measurement Ultrahigh-precision Laser Ranger (error is within 10 micron even if a distance of 10 km is measured)", [Online, retrieved on May 8, 2007], Independent Administrative Institute, Japan Science and Technology Agency, Report of Japan Science and Technology Agency No. 334 issued on Sep. 7, 2006 Internet <http://www.jst.go.jp/pr/info/info334/index.html>.

(Continued)

*Primary Examiner* — Edward Look
*Assistant Examiner* — Jason Davis
(74) *Attorney, Agent, or Firm* — Smith Patent Office

(57) ABSTRACT

The invention provides a ring, rotatable duct, shroud, fuselage or cylindrical external wall fabricated so as to have desirable strength even if its diameter exceeds about 2.7 meters by using arbitrary metallic and non-metallic materials. Such ring and others may be readily fabricated by laminating a thin sheet band made of metal, ceramics, cermet, fiber or synthetic resin of 0.01 mm to 5 mm thick or a thin sheet band made of rubber or silicon of 0.1 mm to 50 mm thick by winding around a giant spinning wheel by at least two rounds or more so as to form a longitudinal plate portion of 2 mm or more in radial thickness when the band is made of metal, ceramics, cermet, fiber or synthetic resin and to form such portion of 4 mm or more thick when the band is made of metal, ceramics, cermet, fiber, synthetic resin, rubber or silicon.

2 Claims, 36 Drawing Sheets

(56) References Cited

U.S. PATENT DOCUMENTS

2007/0221779 A1    9/2007  Ikeda
2008/0240920 A1*  10/2008  Ikeda ........................ 416/179

FOREIGN PATENT DOCUMENTS

| | | |
|---|---|---|
| JP | 2000-62036 A | 2/2000 |
| JP | 3677748 B | 8/2005 |
| JP | 3793545 B | 7/2006 |
| JP | 3595988 B | 6/2007 |
| JP | 3946755 B | 7/2007 |
| JP | 4015175 B | 11/2007 |
| JP | 4053584 B | 2/2008 |
| WO | WO 2005070763 A1 * 8/2005 ............. B64C 27/20 |

OTHER PUBLICATIONS

International Search Report for PCT/JP2008/053040 issued on Apr. 22, 2008.

* cited by examiner

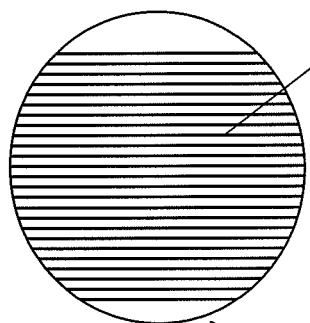
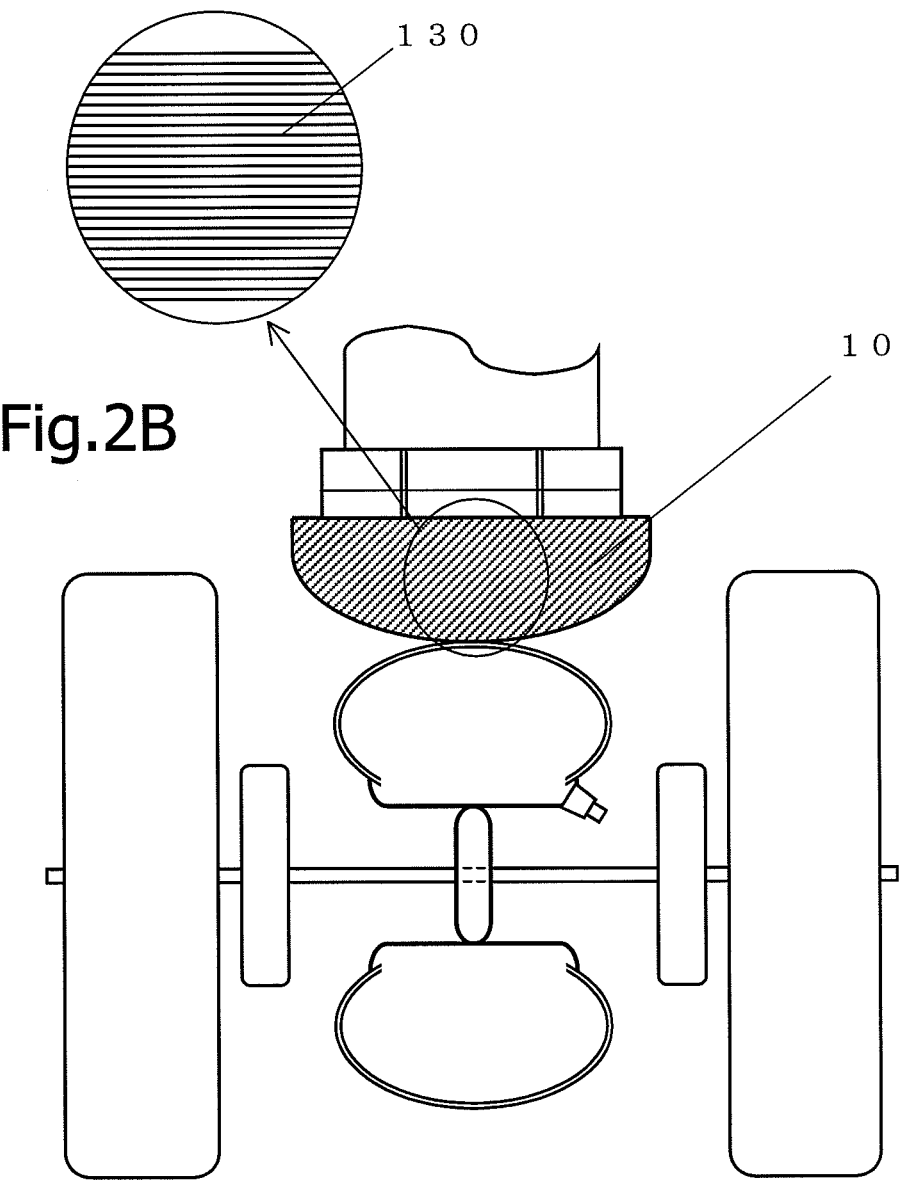

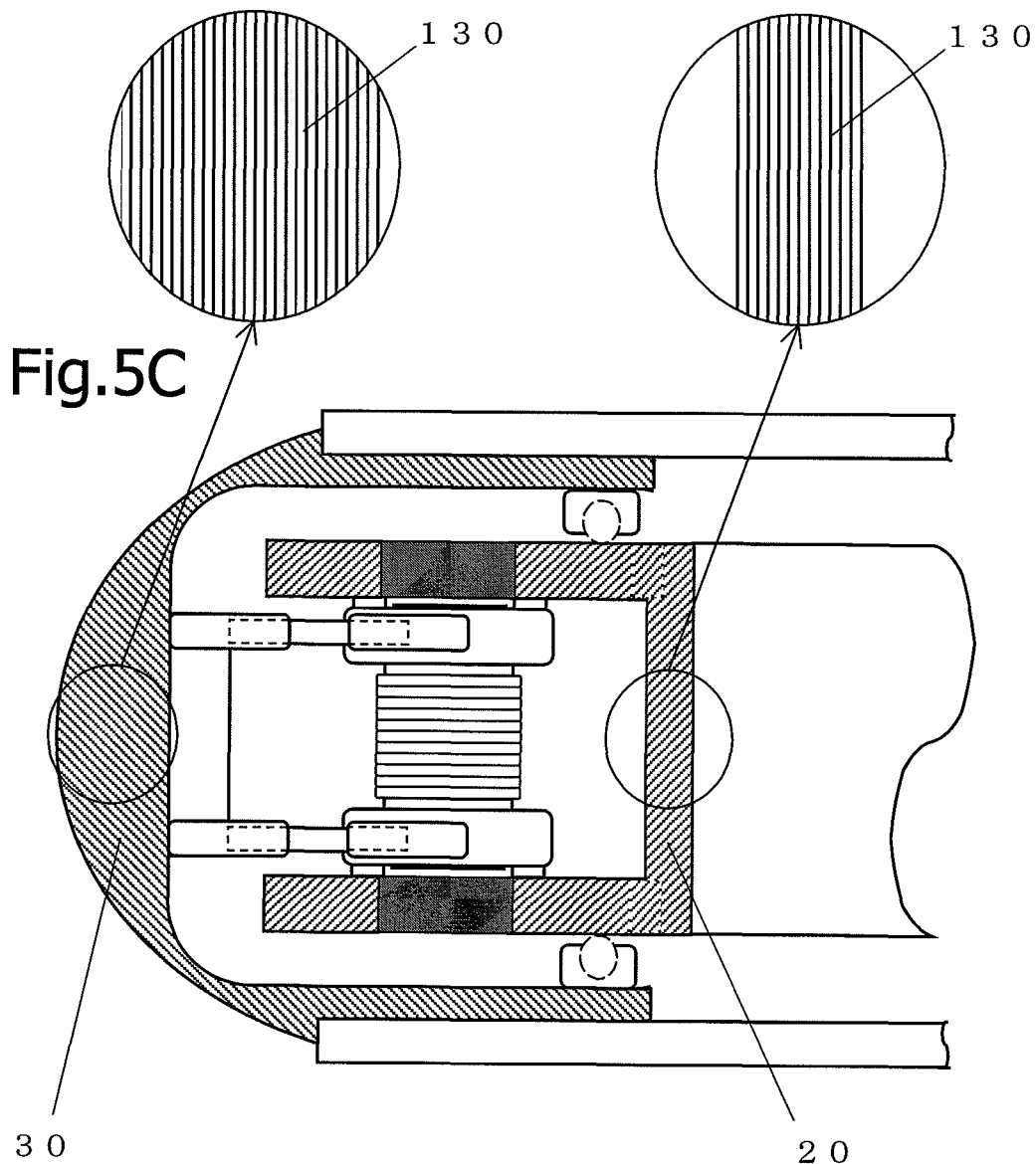

Fig.6A
Fig.6B
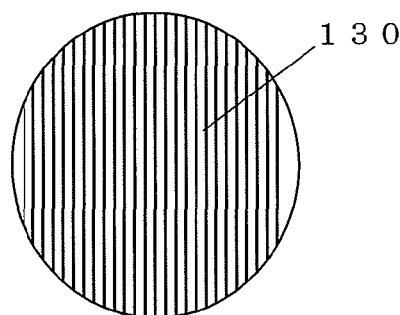
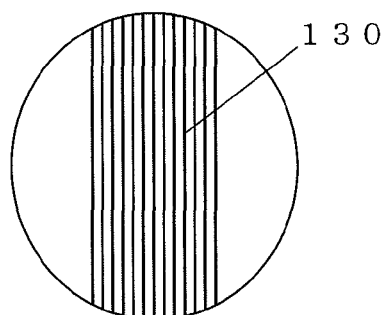
Fig.6C
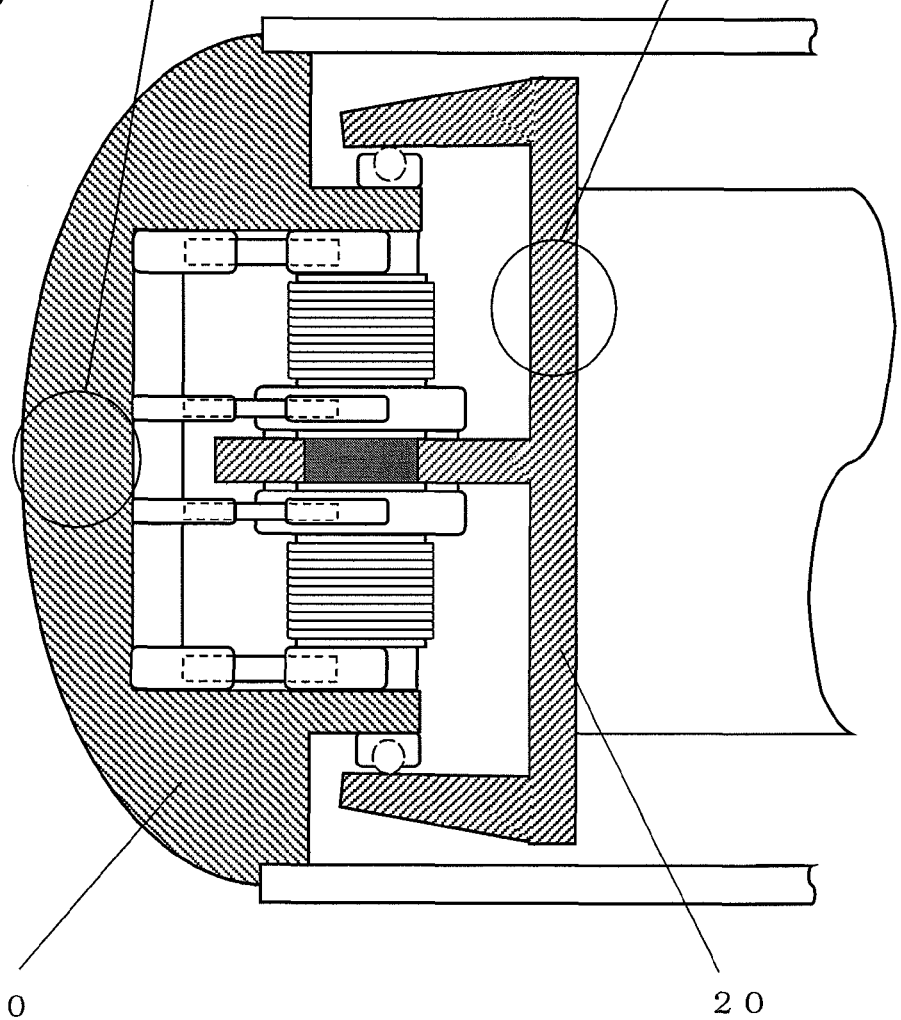

50

130

210b

210b 520  610

800

810

CIRCULAR RING, ROTATING DUCT, SHROUD, TRUNK AND CYLINDRICAL EXTERNAL WALL PREPARED BY LAMINATION OF SHEET BELT, AND APPARATUS AND METHOD FOR PREPARING THE SAME

CROSS REFERENCE TO RELATED APPLICATIONS

This application is a national stage application of PCT Application No. PCT/JP2008/053040 filed on Feb. 22, 2008. The disclosure of PCT Application No. PCT/JP2008/053040 is hereby incorporated by reference.

TECHNOLOGICAL FIELD

The present invention relates to a ring, rotatable duct, shroud and cylindrical external wall whose diameter exceeds about 2.7 meters and which are fabricated by laminating band-like thin sheet (referred to as a "thin sheet band" hereinafter) as well as to an apparatus, tools and a method for fabricating the same.

Specifically, the invention relates to the ring, rotatable duct or shroud of a wind power station for generating power by utilizing tip-speed, the rotatable duct or shroud of a shrouded rotating wing and the cylindrical external wall of a living environment in space fabricated by laminating the thin sheet band made of metal, ceramics, cermet, fiber or synthetic resin having a thickness from 0.01 mm to 5 mm or the thin sheet band made of rubber or silicon having a thickness of 0.1 mm to 50 mm while arbitrarily selecting or overlapping and winding the thin sheet band by at least two rounds or more.

More specifically, the laminated thin sheet band is formed as a longitudinal plate portion whose thickness in the radial direction is 2 mm or more when the thin sheet band is made of metal, ceramics, cermet, fiber or synthetic resin and as a longitudinal plate portion whose thickness is 4 mm or more when the thin sheet band is made of metal, ceramics, cermet, fiber, synthetic resin, rubber or silicon and which goes around a circle substantially in parallel with a diametric center shaft.

BACKGROUND ART

The wind power station mechanically utilizing tip-speed of Patent

Document 1 is provided with a ring that is connected with edges of blades of a windmill and rotates together with the blades. The station is also provided with rollers and tires whose diameter is much smaller than that of the ring and which are attached to the side surface or outer peripheral portion of the ring. The wind power station generates power by mechanically taking out the tip-speed of the ring as a driving force for revolving a generator, so that the larger the diameter of the ring, the more efficiently the station in Patent Document 1 can generate power.

A wind power station electromagnetically utilizing tip-speed in Patent Document 3 is provided with permanent magnets, that create magnetic fields, around the outer peripheral portion of a ring or a rotatable duct and armature coils disposed in the inner peripheral portion of a shroud surrounding the ring or rotatable duct. The station generates power by generating inductive currents from relative speeds between the magnets and the armature coils. Accordingly, the larger the diameter, the more efficiently the station can generate power.

The shrouded rotating wing that generates lift and propulsion of aircrafts described in Patent Documents 4, 5, 6 and 7 generates torque that is a driving force for rotating rotary wings at the wind edge portion, so that the larger the diameter, the more efficiently the shrouded rotating wing can generate torque in any cases.

The ring used in the Patent Document 1 and the ring, rotatable duct or shroud used in Patent Documents 3, 4, 5, 6 and 7 may be fabricated with relatively readily available materials and only with a very simple process of cutting a part of a seam steel pipe into round slices. For instance, if a thickness of the material, e.g., steel, carbon steel, alloy steel or stainless steel, is about 4 mm to 26 mm, a pipe whose diameter is about 660 mm in maximum is available and there exists a pipe whose diameter is as large as about 2.7 meters among spiral seam pipes. Accordingly, the ring, rotatable duct or shroud used in Patent Documents 1 through 7 may be relatively readily fabricated if the pipe is a steel spiral seam pipe whose thickness is about 4 mm to 26 mm and its diameter is about 2.7 meters or less by cutting the pipe into round slices and by slightly working on them.

It is also possible to fabricate the ring, rotatable duct or shroud whose diameter exceeds about 2.7 meter. That is, it is possible to fabricate the ring, rotatable duct or shroud whose diameter is about 4.3 meters by rolling a seam pipe of 26 mm thick and 660 mm in diameter to 4 mm thick by means of cold or hot rolling for example. The diameter may be enlarged to about 8.6 meters by rolling further to 2 mm thick. It is also possible to fabricate the ring, rotatable duct or shroud whose diameter is about 18 meters by rolling a spiral seam pipe of 26 mm thick and 2.7 meters in diameter to 4 mm thick by means of cold or hot rolling and the diameter may be enlarged to about 35 meters by rolling to 2 mm thick.

Because the seam pipe is fabricated by joining one circumferential part of the pipe by means of welding, a welded part, which poses almost no problem when the seam pipe is used as a lengthy pipe, may become a vulnerable part which is prone to be sheared depending on a load when the pipe is sliced and its length becomes shorter than its diameter.

When the material of the seam pipe is the same kind of metal such as steel, carbon steel, alloy steel, stainless steel and the like in this case, it is possible to reduce the risk of shearing the welded part by the load by preparing a plurality of sliced seam pipes and by laminating them so that the welded parts do not overlap by means of cold or hot rolling or by utilizing different expansion rates caused by different temperatures. It is also possible to increase the diameter of the ring, rotatable duct or shroud by rolling the thickness thickened by the lamination. If the slices of the spiral seam pipe whose thickness is 26 mm and whose diameter is 2.7 meters are laminated by four, such method allows the ring, rotatable duct or shroud having a diameter of about 70 meters to be fabricated when it is ideally rolled in the circumferential direction to 4 mm thick and those having a diameter of about 140 meters to be fabricated when it is rolled to 2 mm thick.

It is also possible to fabricate a giant ring, rotatable duct or shroud having a large diameter limitlessly by preparing a thin sheet having a certain width from the beginning, by welding one spot that forms a circle and by shaping by means of rolling. However, the material that can be used for the ring, rotatable duct or shroud is limited to the same type of metals such as steel, carbon steel, alloy steel, stainless steel and the like or to non-ferrous metals such as copper, titanium and the like to laminate and eliminate the weakness of the welded part from a degree of expansion and contraction of the material affected by temperature and from a question whether or not the material has a rollable physical property. Then, it has been very difficult to use other materials such as ceramics, cermet, fiber, synthetic resin, rubber and silicon having different characteristics from metals in combination.

Still more, in the case of rolling, a rolling mill actually used in rolling metal must be a ring rolling mill that is provided with a mechanism capable of rolling only in the circumferential direction while suppressing protrusion in the direction in parallel with the diametric center shaft or a ring rolling mill that rolls by using a material having a thickness and width whose protrusion is anticipated and that is provided with an apparatus that cuts and shapes the protrusion in the rolling final process, instead of permitting the protrusion in the direction parallel to the diametric center shaft during rolling. While the former is complicated and is expensive, the latter derives extra man-hour and waste of the material.

While aircrafts and rockets also use rolled external panels and shells, those external panels and shells are fabricated normally by using a single material and by rolling it by a general purpose-type rolling mill. Even if the diameter of the ring and others to be fabricated is limitless when the ring rolling mill is used in laminating a single material or a plurality of materials, it is difficult to roll a panel which is long in a direction orthogonal to a rolling direction, i.e., in the direction a rolling width, by applying pressure. It is unable to handle such panels whose rolling width is large by the ring rolling mill. Even more, it is considered to be impossible to handle panels used for the cylindrical external wall of the living environment in space by the ring rolling mill.

In the case of aircrafts, the fuselage is constructed also by connecting and pasting a large number of external plates or shells of aluminum or duralumin whose length is much shorter than a length in the circumferential direction of the fuselage to stringers, i.e., an internal structure of the fuselage.

In the case of rockets, the fuselage is constructed by wrapping one thin external metallic plate or shell on an isogrid structure cut out of one solid plate in a case of a small-type rocket and the fuselage is constructed by connecting, pasting and wrapping metallic external plates or shells whose length is shorter than a length in the circumferential direction of the fuselage.

The cylindrical external wall of the living environment in space is presently planned to construct by cutting out the metallic external plate and the isogrid structure, i.e., the internal structure, used in the rockets integrally from one thick plate to form an isogrid panel and to form external plates by connecting a plurality of such panels.

When a rolling mill produces a rolled steel plate as a metal band coil, normally a reel that rotates by power is used to directly wind the rolled metal band and to form the metal band coil. Therefore, an outer diameter of the reel is an inner diameter of the metal band coil. However, needs of clients who purchase the metal band coil vary and there has been a case when the inner diameter of the produced metal band coil differs from that of the metal band coil required by the client.

Corresponding to such cases, Patent Documents 8 and 9 provide structures of an attachment that allows the rolling mill to readily fabricate the metal band coil with any inner diameter corresponding to a request of the client by attaching a removable unit on the reel. They disclose a mechanism that permits to freely select the inner diameter of the metal band coil by fabricating a cylinder having an arbitrary outer diameter by connecting both ends of arcuate attachments at plural spots by a coupling unit composed of double nuts and springs.

Patent Document 2 discloses materials and methods for fabricating
the ring, rotatable duct or shroud of the wind power station utilizing tip-speed and the rotatable duct or shroud of the shrouded rotating wing whose diameter exceeds about 2.7 meters. Following the method disclosed in Patent Document 2 which would not been published at the time when the present application is applied, the present application extends the scope of structures to the fuselage and cylindrical external wall.

Non-Patent Document 1 describes about a precision laser measurement capable of measuring asperity of an object within 10 microns even if the meter is distant from the object by 10 km.

[Patent Document 1] Japanese Application Patent No. 2007-027443
[Patent Document 2] Japanese Patent No. 4053584
[Patent Document 3] Japanese Patent No. 4015175 Gazette
[Patent Document 4] Japanese Patent No. 3946755 Gazette
[Patent Document 5] Japanese Patent No. 3793545 Gazette
[Patent Document 6] Japanese Patent No. 3677748 Gazette
[Patent Document 7] Japanese Patent No. 3595988 Gazette
[Patent Document 8] Japanese Patent Application Laid-open No. Sho.50-53258 Gazette
[Patent Document 9] Japanese Patent No. Sho.-47-29103 Gazette [Non-Patent Document 1] "Success in Development of Fast Measurement Ultrahigh-precision Laser Ranger (error is within 10 micron even if a distance of 10 km is measured)", [Online, retrieved on May 8, 2007], Independent Administrative Institute, Japan Science and Technology Agency, Report of Japan Science and Technology Agency No. 334 issued on Sep. 7, 2006 Internet <http://www.jst.go.jp/pr/info/info334/index.html>

DISCLOSURE OF THE INVENTION

Problems to be Solved by the Invention

A cost performance in fabricating the ring and rotatable duct for the use in the wind power station utilizing tip-speed and the rotatable duct or shroud of the shrouded rotating wing that generates lift and propulsion of aircrafts has been favorable because they may be fabricated even just by slicing the spiral seam pipe for example if the diameter is up to about 2.7 meters. However, if the diameter exceeds about 2.7 meters, such problems that it is problem some to roll by the rolling mill and that the material is limited to what can be rolled arise even in fabricating the ring, rotatable duct or shroud. Even more, while the cylindrical external wall of living environment in space cannot be fabricated by means of rolling and are fabricated by bending, riveting and welding members or by pasting tile-like members, it is not easy to fabricate the ring, rotatable duct, shroud and cylindrical external wall so as to have desirable strength by arbitrarily selecting materials.

Accordingly, the invention aims at readily fabricating the ring, rotatable duct, shroud and cylindrical external wall having the desirable strength by using arbitrary materials including metal, ceramics, cermet, fiber, synthetic resin, rubber and silicon even if their diameter exceeds about 2.7 meters and their circumferential length exceeds several hundred meters or 1 km.

Means for Solving the Problems

The invention provides a ring, rotatable duct, shroud and a cylindrical external wall as well as an apparatus and a method for fabricating the same, i.e., the ring, rotatable duct or shroud of a wind power station for generating power by utilizing tip-speed, the rotatable duct or shroud of a shrouded rotating wing and the cylindrical external wall of a living environment in space, comprising a longitudinal plate portion. The longitudinal plate portion is fabricated by winding thin sheet band being selected from arbitrary one being made of material such as metal, ceramics, cermet, fiber or synthetic resin having a thickness from 0.01 mm to 5 mm, and/or the other one being made of material such as rubber or silicon having a thickness of 0.1 mm to 50 mm, around a giant spinning wheel (referred to also as 'a giant spinning wheel composition' hereinafter) for spinning the thin sheet band at least by two rounds, and laminating the selected thin sheet band each other. The laminate thickness of the longitudinal plate portion is set to at least 2 mm when the laminated thin sheet band is made of material such as metal, ceramics, cermet, fiber or synthetic resin, and is set to at least 4 mm when the laminated thin sheet band is made of material such as metal, ceramics, cermet, fiber or synthetic resin, rubber or silicon.

Thereby, it is possible to readily fabricate the ring, rotatable duct, shroud and cylindrical external wall having enough strength by using the arbitrary material even if they are as large as their diameter exceeds 2.7 meters or more or even if they are so gigantic as their diameter exceeds several hundred meters or several km exceeding 1,000 meters.

Advantageous Effects of the Invention

The present invention brings about the following three advantageous effects by fabricating the ring, rotatable duct, shroud or cylindrical external wall by laminating the thin sheet band. Firstly, it is possible to eliminate the prior art weak point of the welded part that is otherwise found when a bent seam pipe or a plate member is welded in the longitudinal plate portion that goes around the circle substantially in parallel with the diametric center shaft of the ring, rotatable duct, shroud and cylindrical external wall.

For example, the ring, rotatable duct, shroud or cylindrical external wall fabricated by slicing a prior art seam steel pipe of 4 mm thick and 2.7 meters in diameter and by rolling and shaping more or less has the weak point of the welded part of 4 mm in depth in part of the circumferential portion. However, when the ring, rotatable duct, shroud or cylindrical external wall of 4 mm thick and having a diameter of 2.7 meter is fabricated by laminating the thin sheet band of 0.1 mm thick and made of the same material by winding around the giant spinning wheel continuously by 40 rounds, by bonding the entire circle between the respective thin sheet bands by means of adhesion, pressure bonding and the like or by joining at least the starting and ending points and by shaping the laminated thin sheet band, substantially no welded part is created, so that the ring and others have the similar strength with a case when a very few seamless pipe of small diameter is cut in slice. Still more, even if the ring and others are fabricated by laminating the thin sheets of 0.1 mm of different materials, i.e., metal, ceramics, cermet, fiber, synthetic resin, rubber and silicon per one round, a depth corresponding to the welded part is 1/40 as compared to that of the prior art ring, rotatable duct, shroud and cylindrical external wall fabricated from the seam pipe if the thin sheets are wound so that parts corresponding so-called to the welded part do not overlap. Accordingly, the ring and others of the invention are remarkably toughened against a stress applied from the direction in parallel with the diametric center shaft.

Secondly, it is possible to fabricate the ring, rotatable duct, shroud and cylindrical external wall by laminating a combination of optimal materials by combining arbitrary selected materials that can be made into the thin sheet band. When the material of the thin sheet band wound around by 40 rounds is all the same type of metal for example, the respective thin sheet bands may be closely adhered by welding, rolling, pressure-welding and cladding. Further, even if the thin sheet bands wound around by 40 rounds are different metal and ceramics, respectively, the thin sheet bands may be closely adhered by either method of adhesion by using adhesive, welding, pressure-bonding and cladding, so that the ring, rotatable duct, shroud and cylindrical external wall that can sustain to a large stress applied from the direction parallel with the diametric center shaft may be fabricated readily while lightening its weight by utilizing the characteristics of the materials in maximum.

Thirdly, it is possible to readily fabricate the ring, rotatable duct or shroud having a giant diameter of several km exceeding 1 km, not mentioning about a large diameter of several hundred meters, as long as there is an acreage in the manufacturing site. Still more, not only being able to resist against the large stress applied from the direction parallel with the diametric center shaft, the ring composed of the thin sheet band can exhibit high elasticity against a wide range of stresses including hydraulic pressure and collision from the diametrical direction by adequately setting the materials and thickness, so that it may be used as ones in which a difference between an internal pressure and an external pressure bounded by the longitudinal plate portion is great such as the cylindrical external wall of the living environment in space.

BEST MODES FOR CARRYING OUT THE INVENTION

The present invention seeks how to readily fabricate a large and rigid longitudinal plate portion (130) that composes a ring (10), a rotatable duct (20) or a shroud (30) of a wind power station for generating power by mechanically or electromagnetically utilizing tip-speed of a windmill, a rotatable duct (20) or a shroud (30) of a shrouded rotating wing that generates lift and propulsion of aircrafts and a cylindrical external wall (50) of a living environment in space as shown in FIGS. 1 through 7.

Roughly the following three things must be prepared in carrying out the invention. The first one is a thin sheet band (100) that is a thin sheet of metal, ceramics, cermet, fiber, synthetic resin, rubber or silicon that composes a ring (10), a rotatable duct (20), a shroud (30) or a cylindrical external wall (50). When the material is metal, ceramics, cermet, fiber or synthetic resin, the thin sheet band (100) is prepared by selecting out of thin sheets whose thickness is 0.01 mm to 5 mm, and when the material is rubber or silicon, the thin sheet band (100) is prepared by selecting out of thin sheets whose thickness is from 0.1 mm to 50 mm.

The second one to be prepared is a giant spinning wheel composition (200). The giant spinning wheel composition (200) has the shape of a donut whose diameter of the outer peripheral portion thereof is about at least 2.7 meters and may be as large as several km in diameter in some cases. Normally, the donut part is divided into eight or more parts (referred to as 'giant spinning wheel portion' hereinafter) which are to be combined as necessary to use as the giant spinning wheel composition (200). Accordingly, when a giant spinning wheel (200) whose diameter is 3 meters for instance is divided equally into eight parts, a length in the direction of forming a circle arc of the giant spinning wheel portion (210) is about 1 meter. Its plan view is similar to the shape of a part of a Japanese fan on which a sheet of paper is pasted to catch wind or to a piece of a Baumkuchen. That is, when a diameter of the giant spinning wheel composition (200) is 3 km and when the circumferential length of the giant spinning wheel portion (210) is about 1 meter for example, 9,424 pieces of giant spinning wheel portions (210) are used and 18,848 pieces of giant spinning wheel portions (210) are used when the circumferential length of the giant spinning wheel portion (210) is about 0.5 meter. The giant spinning wheel portion (210) is fabricated by selecting a single material or by combining a plurality of materials out of steel stocks such as steel, carbon steel, alloy steel and stainless steel, nonferrous metals such as copper and titanium and ceramics and cermet.

The third one is a work environment in which temperature and moisture may be controlled in fabricating the ring and the like on the ground or at sea. Although an air conditioning facility poses almost no problem in a case of fabricating the giant spinning wheel composition (200) whose diameter is around 3 meters, it is almost impossible when the diameter of the giant spinning wheel composition (200) extends as large as several km to constantly keep the temperature and moisture of the whole area covering the giant spinning wheel composition (200). Energy is also insufficiently consumed. Then, the work environment is made by covering a greenhouse (900) that is normally seen in greenhouse cultivation for example. The greenhouse (900) may be formed as a double or triplex structure as necessary. However, the greenhouse (900) is not necessary in fabricating the cylindrical external wall (50) of the living environment in space at the site where it is fabricated and a shielding plate or film for shielding the direct sun light is prepared and disposed in the direction of the sun.

The giant spinning wheel composition (200) described above as
 the second one to be prepared is fabricated by selecting out of metal, ceramics and cermet as its material and has the shape of a donut whose diameter of the outer peripheral portion is about at least 2.7 meters. The diameter may be as large as several km. Accordingly, because its whole volume and weight becomes large, the parts of at least around eight pieces are fabricated as the giant spinning wheel portions (210) whose length of arc is 1 meter or 50 cm and are combined in use.

Each giant spinning wheel portion (210) has a part of appearance side that composes the outer peripheral portion of the circular arc of the giant spinning wheel composition (200), and a part of back side that composes the inner peripheral portion of the circular arc. The part of appearance side forms a substantially flat plane of the ring (10), the rotatable duct (20), the shroud (30) or the cylindrical external wall (50) that runs in parallel with the diametric center shaft. However, depending on the shape of the ring (10), the rotatable duct (20), the shroud (30) and the cylindrical external wall (50) to be fabricated, the outer peripheral portion may be formed into a convex surface so that it becomes distant from the diametric center shaft or conversely into a concave surface.

As shown in FIGS. 8 through 11, although the part of appearance side of the giant spinning wheel portion (210) is flat and has nothing thereon, the giant spinning wheel portion (210) includes a coupling unit (220) for coupling the giant spinning wheel portions (210) in forming the giant spinning wheel composition (200), column supporting holes (211 and 212) for holding the giant spinning wheel composition (200), flap retaining bolt holes (213) for securing starting and ending point flaps (121, 122) for anchoring a starting point of the thin sheet band (100) to be wound, ending and/or starting points of mid-way position and an ending point in ending spinning to the giant spinning wheel portion (210) and a light wave/laser reflector (230) used in measuring changes of the diameter of the giant spinning wheel composition (200) in spinning the thin sheet band (100) to the giant spinning wheel composition (200) by a light wave/laser distance measuring instrument (800). It is noted that while the light wave/laser reflector (230) improves reflection efficiency when light wave or laser is used to improve accuracy of a measured distance and to reduce energy of radiation, the measurement of the distance may be carried out in a natural condition as described in Non-Patent Document. Accordingly, it is possible to remove the light wave/laser reflector (230) from the inner surface and to measure the distance to a reference plane if the plane at the central part of the inner surface is set as the reference plane.

As shown in FIGS. 12 through 15, the coupling unit (220) couples the adjacent giant spinning wheel portions (210) and is composed of at least either one of a bolt (221) or nut (222) on the sides of each giant spinning wheel portion (210), i.e., at least one each on each side and two or more in total. While the side surface of the giant spinning wheel portion (210) coupled each other by the coupling unit (220) is normally a plane run in parallel with the radial direction, the side surface may be a combination of convex and concave surfaces or may have other shapes as long as the adjacent giant spinning wheel portions (210) may be fittingly adhered from each other. Because the coupling unit (220) has at least either one of the bolt (221) and the nut (222), it is possible to tighten the coupling units (220) or to forcibly elongate conversely by the action of the nut (222) as shown in FIGS. 15A and 15C.

While the thin sheet band (100) prepared first is spun around the giant spinning wheel composition (200) secondly prepared, the part of appearance side of the giant spinning wheel portion (210) is normally a smooth flat plane having nothing to hold and a spinning starting point of the thin sheet band (100) cannot be anchored as it is. Then, as shown in FIGS. 16 through 23, the starting and ending point flap (120) having a flap overlap width section (124) for joining the starting point of the thin sheet band (100) is prepared and is secured to the giant spinning wheel composition (200) through the flap holding bolt hole (213) of the giant spinning wheel portion (210) to join the starting point of the thin sheet band (100) to the flap overlap width section (124) and to start spinning. After completing the spinning of the thin sheet band (100) to the giant spinning wheel composition (200), the spun item is consummated by pulling out the starting and ending point flap (120) by unlocking the joint portion or by cutting only part sticking out of the thin sheet band (100) to shape.

While the thin sheet band (100) prepared first is spun around the giant spinning wheel composition (200) secondly prepared, the part of appearance side of the giant spinning wheel portion (210) is normally a smooth flat plane having nothing to hold and a spinning starting point of the thin sheet band (100) cannot be anchored as it is. Then, as shown in FIGS. 16 through 23, the starting and ending point flap (121, 122) having a flap overlap width section (124) for joining the starting point of the thin sheet band (100) is prepared and is secured to the giant spinning wheel composition (200) through the flap holding bolt hole (213) of the giant spinning wheel portion (210) to join the starting point of the thin sheet band (100) to the flap overlap width section (124) and to start spinning. After completing the spinning of the thin sheet band (100) to the giant spinning wheel composition (200), the spun item is consummated by pulling out the starting and ending point flap (120) by unlocking the joint portion or by cutting only part sticking out of the thin sheet band (100) to shape.

While there are two types of starting and ending point flaps (121, 122), i.e., a sole one-sheet type starting and ending point flap 121 as shown in FIG. 22 and a starting and ending point flap 122 that works as a set by two each as shown in FIGS. 17 through 20. The former is mainly used in using the same type of thin sheet band (100) from the starting point to the ending point without changing the thin sheet band (100) per round and the latter is mainly used in changing the types of the thin sheet band (100) per several rounds.

The thin sheet band (100) whose starting point is anchored to the giant spinning wheel composition (200) and whose tension is controlled by a tension controller (300) that can control spinning strength as shown in FIGS. 23 through 29 is wound around the outer peripheral portion of the giant spinning wheel composition (200) and sequentially forms the longitudinal plate portion (130) and composes the ring (10), the rotatable duct (20), the shroud (30) or the cylindrical external wall (50). While it is possible to fabricate the ring (10), the rotatable duct (20) and the shroud (30) by one giant spinning wheel (200), a necessary number of giant spinning wheels (200) are put together as shown in FIG. 29 in fabricating the longitudinal plate portion (130) that runs substantially in parallel with the diametric center shaft is long like the cylindrical external wall (50). In fabricating the longitudinal plate portion (130) by these methods, the entire area or spots between the respective thin sheet bands (100) are bonded to enhance the strength of the spun thin sheet band (100). Bonding by means of adhesives, welding, pressure-welding and pressure bonding is used. As a method of the pressure-welding, explosive pressure-welding (explosive bonding) using clayey explosive (740) as shown in FIG. 30.

While the material of the thin sheet band (100) may be selected from metal, non-metal, ceramics, cermet, fiber, synthetic resin, rubber or silicon corresponding its purpose and the thin sheet band is normally not meshed (mesh-less thin sheet band 101), meshed thin sheet bands (102) may be used in several layers of the rounds to lighten the thin sheet bands as necessary.

It is possible to carry out the spinning works implemented by preparing the thin sheet band (100) described above as the first one to be prepared and the giant spinning wheel composition (200) described as the second one by placing the respective materials directly on a ground or sea-based facility. However, it is desirable to have a certain height from the ground as a work environment in carrying out such works of fastening or elongating the giant spinning wheel composition (200), of spinning the coiled thin sheet band (100) and of shaping the rotatable duct (20) or the shroud (30) by using a shaping roller (400). Due to that, the coiled thin sheet band (100) is installed on a thin sheet band coil table (510, 520) having a ground height matching with a height of persons and the giant spinning wheel composition (200) is also used by similarly installing on a pillar unit (610, 620) having a ground height matching with the height of persons as shown in FIGS. 31 through 34.

Normally, the pillar unit (610, 620) is a stationary pillar unit (stationary system) (620) that cannot be moved significantly, though it may be finely adjusted, and a movable thin sheet band coil table (movable system) (510) is arranged to be able to travel around the outer periphery of the pillar unit on rails for example. When a plurality of thin sheet bands (100) is prepared in this case, a plurality of thin sheet band coil tables (movable system) (510) may be arrayed on the rails. This system can be constructed even if the diameter of the giant spinning wheel composition (200) is several km in size.

When the diameter of the giant spinning wheel composition (200) is up to around several hundred meters, it is also possible to set the coiled thin sheet band (100) on a thin sheet band coil table (stationary system) (520) and to set the giant spinning wheel composition (200) on a pillar unit (movable system) (610) as shown in FIG. 34.

The diameter of the giant spinning wheel composition (200) is fastened and normally decreases as the thin sheet band (100) is wound around and a number of rounds increases. A degree of the decrease of the diameter is determined by measuring distances to light wave/laser reflectors (230) attached respectively to the giant spinning wheel portions (inner side) (210*b*).

The distance is measured by transmitting/receiving laser by placing a light wave/laser distance measuring instrument (800) at the central part of the giant spinning wheel composition (200) as shown in FIG. 35, by guiding light wave or laser to the light wave/laser reflectors (230) by optical cables (820) as shown in FIG. 36 or by transmitting and receiving light wave or laser by setting a plurality of small precision distance measuring instruments (close-range) (830), i.e., light/laser transmitters/receivers, at the very vicinity of the light wave/laser reflectors (230). The distances are calculated by a computer based on the measured results to determine rotational angles of the nuts (222) of the coupling unit (220) as shown in FIGS. 15A and 15C to normally forcibly elongate or to tighten the giant spinning wheel portions depending on a special condition of correcting distortion or the like by using a wrench, a spanner or the like. If the operation of winding the thin sheet band (100) around the giant spinning wheel composition (200) is carried out without forcibly elongating the giant spinning wheel portions by the nut (222) of the coupling unit (220), the giant spinning wheel composition (200) is fastened by the ring (10), the rotatable duct (20), the shroud (30) or the cylindrical external wall (50), i.e., the fabricated product, and cannot be removed out of the fabricated product when the operation of fabricating the ring (10), the rotatable duct (20), the shroud (30) and the cylindrical external wall (50) is finished. Accordingly, the fine adjustment of the nut (222) of the coupling unit (220) is very important in the operation of fabricating the ring (10), the rotatable duct (20), the shroud (30)-and the cylindrical external wall (50).

The thin and long thin sheet band (100) elongates or contracts depending on conditions of temperature and humidity. Accordingly, the operation of winding the thin sheet band around the giant spinning wheel composition (200) requires an environment in which temperature and humidity are constant and incidence of solar beams does not vary for example. It is difficult to prepare such environment by constructing a normal building in fabricating the ring (10), the rotatable duct (20) or the shroud (30) whose diameter is as large as several km. Therefore, the constant temperature and humidity environment to be prepared thirdly is created by utilizing the greenhouse (900) that is normally used in greenhouse cultivation as shown in FIG. 38. The greenhouse (900) may be faulted as a double, triplex or more structure from a correlation with the outside environment. However, although the greenhouse (900) is unnecessary in fabricating the cylindrical external wall (50) in space, a light shielding plate or film for avoiding the direct sunlight must be prepared.

First Embodiment:

FIGS. 1 through 7 illustrate an embodiment of a ring, rotatable duct or shroud of a wind power station for generating power by utilizing tip-speed, a rotatable duct or shroud of a shrouded rotating wing and a cylindrical external wall of a living environment in space, whose diameter exceeds about 2.7 meters, comprising a longitudinal plate portion which goes around a circle substantially in parallel with a diametric center shaft. The longitudinal plate portion is fabricated by winding thin sheet band being selected from arbitrary one being made of material such as metal, ceramics, cermet, fiber or synthetic resin having a thickness from 0.01 mm to 5 mm, and/or the other one being made of material such as rubber or silicon having a thickness of 0.1 mm to 50 mm, around at least by two rounds, and laminating the selected thin sheet band each other. The laminate thickness of the longitudinal plate portion is set to at least 2 mm when the laminated thin sheet band is made of material such as metal, ceramics, cermet, fiber or synthetic resin, and is set to at least 4 mm when the laminated thin sheet band is made of material such as metal, ceramics, cermet, fiber or synthetic resin, rubber or silicon.

Second Embodiment:

FIGS. 8 through 17 and FIGS. 35 through 37 illustrate an embodiment
- of an apparatus for fabricating the ring, rotatable duct, shroud and cylindrical external wall, comprises a plurality of giant spinning wheel portions and an accurate distance measuring unit. The plurality of giant spinning wheel portions compose, when a whole number of the adjacent portions are coupled each other, a giant spinning wheel which has the shape of a donut and whose diameter is about at least 2.7 meters for winding the thin sheet band. Each giant spinning wheel portion of the giant spinning wheel has a part of appearance side and a part of back side. The part of appearance side has a circular arc shape approximately similar to a piece of a Baumkuchen. The part of back side is provided with a reference plane or a reflector for measuring a distance by means of light wave or laser. The each giant spinning wheel portion further comprises at least two coupling units in total to assemble as the giant spinning wheel. The coupling units have at least either one of a bolt or a nut for coupling the plurality of the giant spinning wheel portions at both ends thereof in the adjacent direction. The apparatus comprises the accurate distance measuring unit for accurately measuring a distance from the center of the giant spinning wheel to the giant spinning wheel portion, i.e., the diameter of the giant spinning wheel, by means of the light wave or laser during a period from beginning to end of the thin sheet band winding around the giant spinning wheel. Therefore the apparatus is able to make the thin sheet band to be wound precisely around the giant spinning wheel while controlling the diameter of the giant spinning wheel by fastening or loosening the bolts and nuts of the coupling units of the giant spinning wheel portions based on the measured result of the distance from the center of the giant spinning wheel to the giant spinning wheel portions.

Third Embodiment:

FIGS. 16 through 22, FIGS. 23 through 29 and FIG. 30 show an embodiment of a method for fabricating the ring, rotatable duct, shroud and cylindrical external wall, including steps of anchoring a starting point of the thin sheet band of the first embodiment to the giant spinning wheel of the second embodiment, of winding the thin sheet band whose starting point is anchored to the giant spinning wheel around the giant spinning wheel by 2 rounds or more, and of fixing between the laminated thin sheet bands by either one method of bonding the entire area between the laminated thin sheet bands to be wound, bonding by spots or bonding only starting and ending points. It is noted that while only the explosive pressure-welding (explosive bonding) has been shown as an example of bonding between the thin sheet bands, other methods, e.g., bonding by means of synthetic resin adhesives, a bonding technique by means of welding and the like, are known and are not shown in the description.

Industrial Applicability

The strength of the longitudinal plate portion may be remarkably enhanced and the ring, rotatable duct or shroud of the wind power station for generating power by utilizing tip-speed, the rotatable duct or shroud of the shrouded rotating wing and the cylindrical external wall of the living environment in space having a very large diameter may be readily fabricated by fabricating the longitudinal plate portion by winding the thin sheet bands of the invention around the giant spinning wheel by at two round or more as compared to prior art methods of fabricating the ring, rotatable duct, shroud and cylindrical external wall by riveting or welding rolled plates or by pasting precut plates.

Accordingly, the invention permits to readily fabricate ones which have been almost impossible to fabricate and thus is beneficial in fabricating the ring, rotatable duct or shroud of the wind power station utilizing tip-speed which generates power more efficiently when its diameter is large, the rotatable duct or shroud of the shrouded rotating wing that can generate torque efficiently when its diameter is large, the cylindrical external wall of the living environment in space.

BRIEF DESCRIPTION OF THE DRAWINGS

FIG. 2A is an enlarged section view of a longitudinal plate portion of a ring a wind power station mechanically deriving and utilizing tip-speed by abutting tires against the ring, illustrating that the longitudinal plate portion that runs substantially in parallel with a diametric center shaft of the ring is fabricated by laminating thin sheet bands selectively composed of metal, ceramics, cermet, fiber, synthetic resin, rubber or silicon.

FIG. 2B is a partial section view illustrating a ring part of the wind power station mechanically deriving and utilizing tip-speed by abutting tires against the ring.

FIG. 5A is an enlarged section view of a longitudinal plate portion of a shroud of a shrouded rotating wing, illustrating that the longitudinal plate portion that runs substantially in parallel with a diametric center shaft is fabricated by laminating thin sheet bands selectively composed of metal, ceramics, cermet, fiber, synthetic resin, rubber or silicon.

FIG. 5B is an enlarged section view of a longitudinal plate portion of a rotatable duct of the shrouded rotating wing, illustrating that the longitudinal plate portion that runs substantially in parallel with a diametric center shaft is fabricated by laminating thin sheet bands selectively composed of metal, ceramics, cermet, fiber, synthetic resin, rubber or silicon.

FIG. 5C is a partial section view of a driving section of the shrouded rotating wing generating lift and propulsion.

FIG. 6A is an enlarged section view of a longitudinal plate portion of a shroud of a shrouded rotating wing, illustrating that the longitudinal plate portion that runs substantially in parallel with a diametric center shaft of the ring is fabricated by laminating thin sheet bands selectively composed of metal, ceramics, cermet, fiber, synthetic resin, rubber or silicon.

FIG. 6B is an enlarged section view of a longitudinal plate portion of a rotatable duct of the shrouded rotating wing, illustrating that the longitudinal plate portion that runs substantially in parallel with a diametric center shaft is fabricated by laminating thin sheet bands selectively composed of metal, ceramics, cermet, fiber, synthetic resin, rubber or silicon.

FIG. 6C is a partial section view of a driving section of the shrouded rotating wing generating lift and propulsion.

EXPLANATION OF REFERENCE NUMERALS

Figures 1A, 1B:
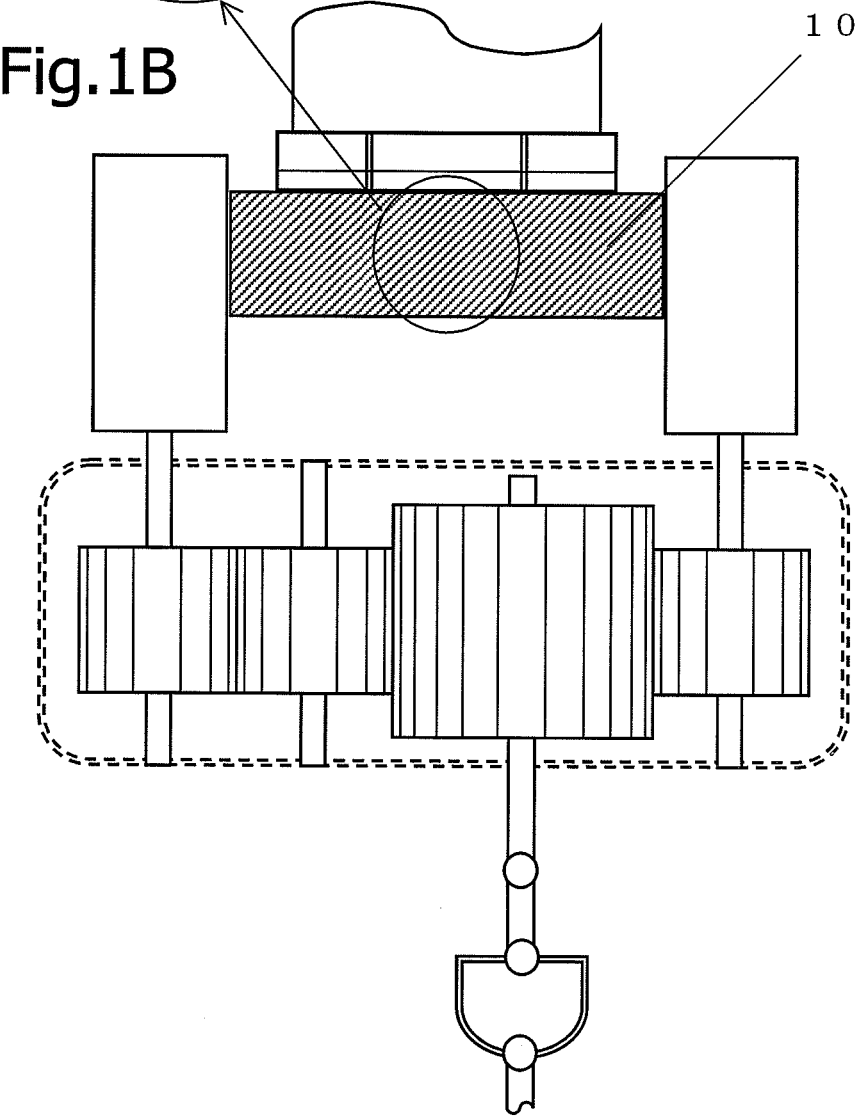
FIG. 1A is an enlarged section view of a longitudinal plate portion of a ring of a wind power station mechanically deriving and utilizing tip-speed by abutting rollers against the ring, illustrating that the longitudinal plate portion that runs substantially in parallel with a diametric center shaft of the ring is fabricated by laminating thin sheet bands selectively made of metal, ceramics, cermet, fiber, synthetic resin, rubber or silicon.
FIG. 1B is a partial section view illustrating a ring part of the wind power station.
Figure 3A:
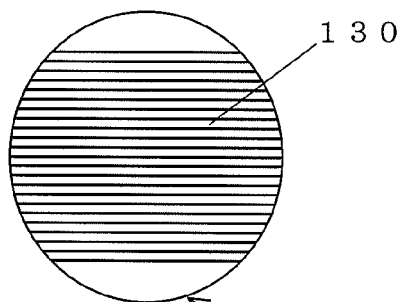
FIG. 3A is an enlarged section view of a longitudinal plate portion of a shroud of a wind power station electromagnetically utilizing tip-speed, illustrating that the longitudinal plate portion that runs substantially in parallel with a diametric center shaft is fabricated by laminating thin sheet bands selectively composed of metal, ceramics, cermet, fiber, synthetic resin, rubber or silicon.
Figure 3B:
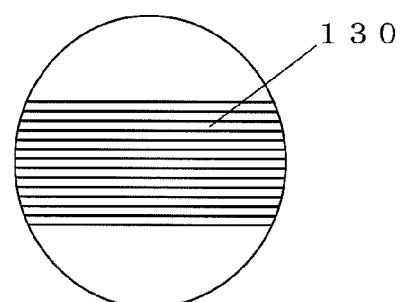
FIG. 3B is an enlarged section view of a longitudinal plate portion of a rotatable duct of the wind power station, illustrating that the longitudinal plate portion that runs substantially in parallel with a diametric center shaft is fabricated by laminating thin sheet bands selectively composed of metal, ceramics, cermet, fiber, synthetic resin, rubber or silicon.
Figure 3C:
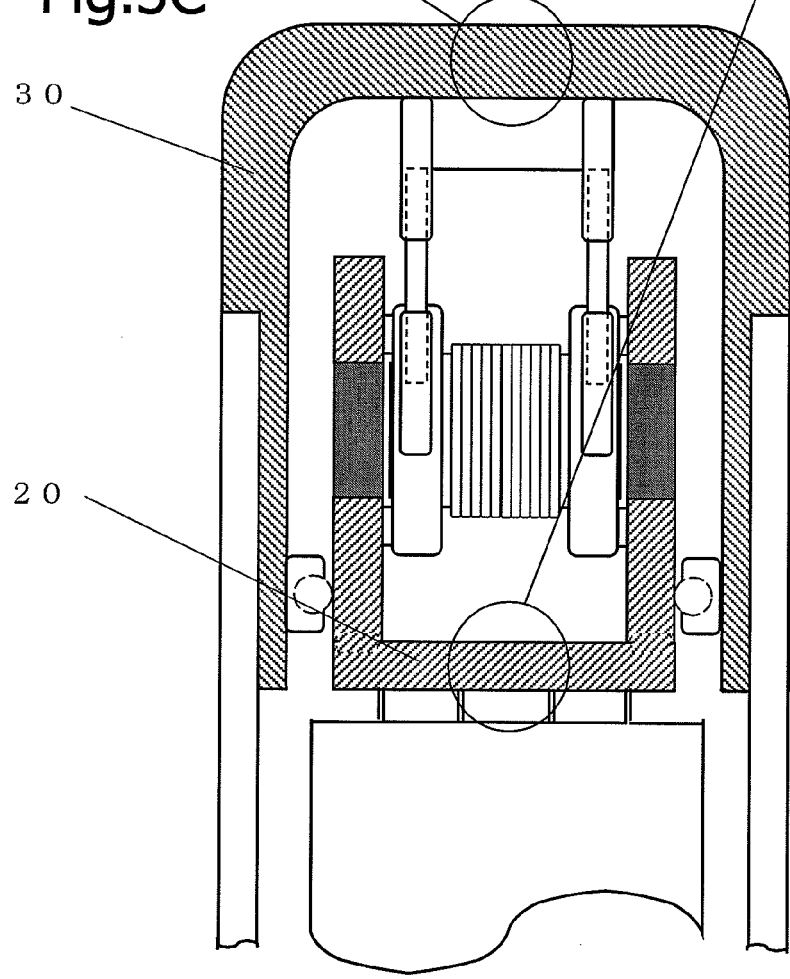
FIG. 3C is a partial section view of a generating section of the wind power station electromagnetically utilizing tip-speed.
Figure 4A:
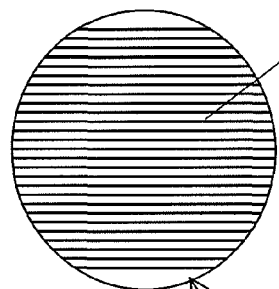
FIG. 4A is an enlarged section view of a longitudinal plate portion of a shroud a wind power station electromagnetically utilizing tip-speed, illustrating that the longitudinal plate portion that runs substantially in parallel with a diametric center shaft is fabricated by laminating thin sheet bands selectively composed of metal, ceramics, cermet, fiber, synthetic resin, rubber or silicon.
Figure 4B:
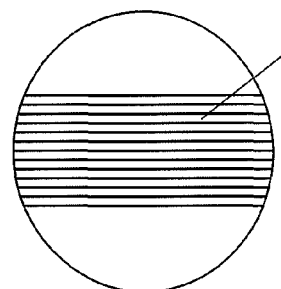
FIG. 4B is an enlarged section view of the longitudinal plate portion of a rotatable duct of the wind power station, illustrating that the longitudinal plate portion that runs substantially in parallel with a diametric center shaft is fabricated by laminating thin sheet bands selectively composed of metal, ceramics, cermet, fiber, synthetic resin, rubber or silicon.
Figure 4C:
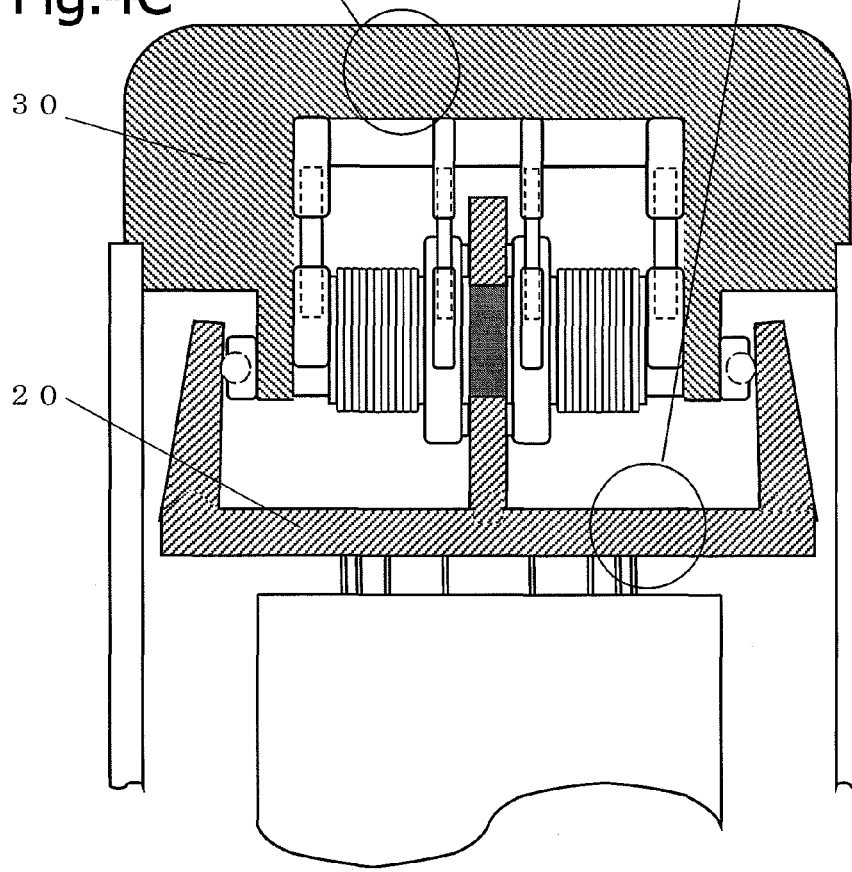
FIG. 4C is a partial section view of a generating section of the wind power station electromagnetically utilizing tip-speed.
Figure 7A:
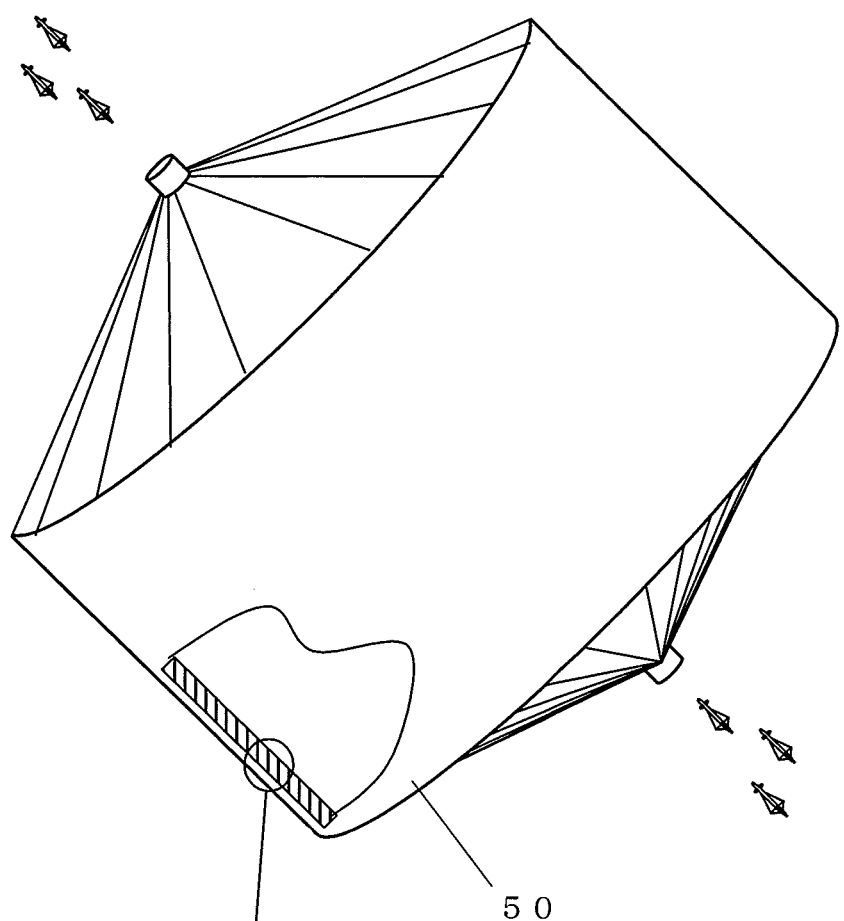
FIG. 7A is a partial section view when a cylindrical external wall of a living environment in space is fabricated by the thin sheet bands.
Figure 7B:
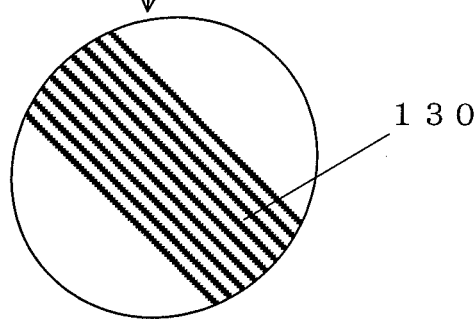
FIG. 7B is an enlarged section view of a longitudinal plate portion composing the cylindrical external wall.
Figure 8A:
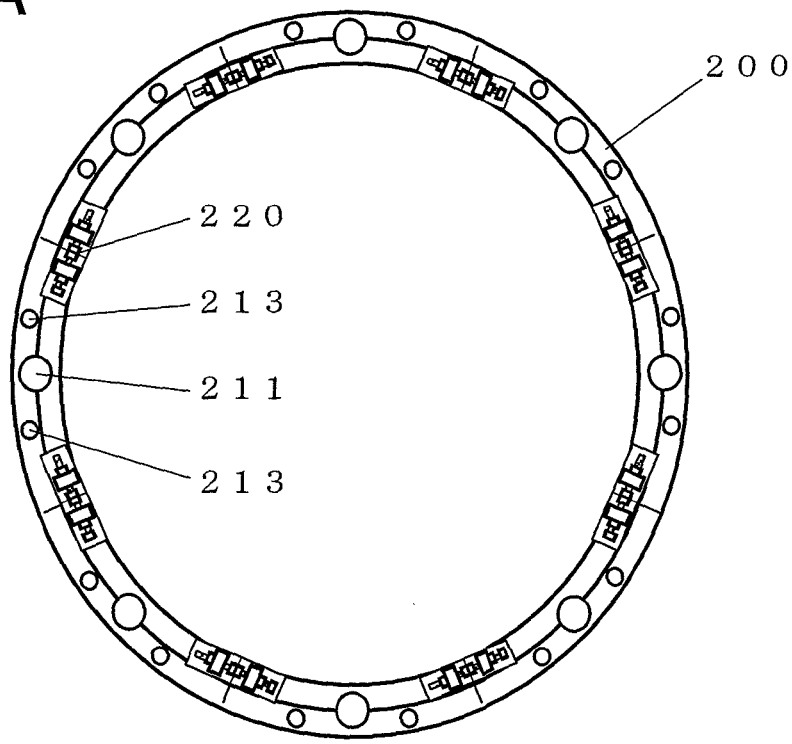
FIG. 8A is a plan view of a giant spinning wheel composition.
Figure 8B:
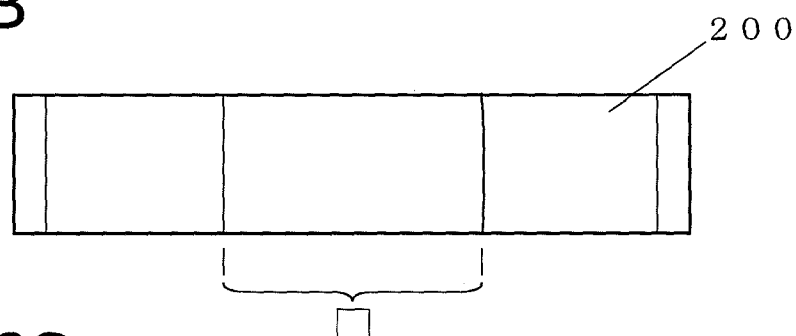
FIG. 8B is a front view of the giant spinning wheel composition.
Figure 8C:
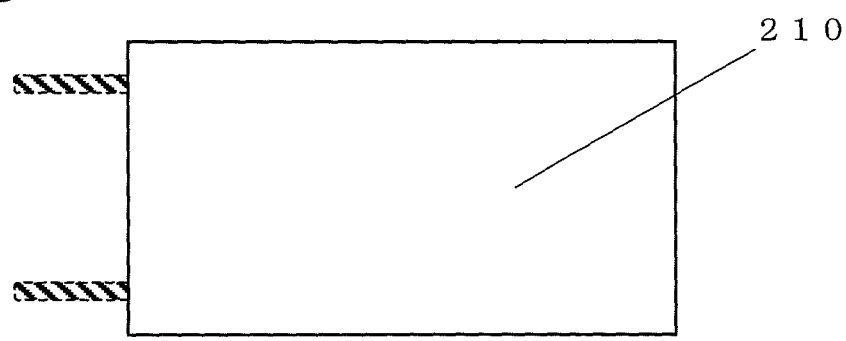
FIG. 8C is a front view of one set of a giant spinning wheel portion that is a part of the giant spinning wheel composition and seen from the outer peripheral portion thereof.
Figure 9A:
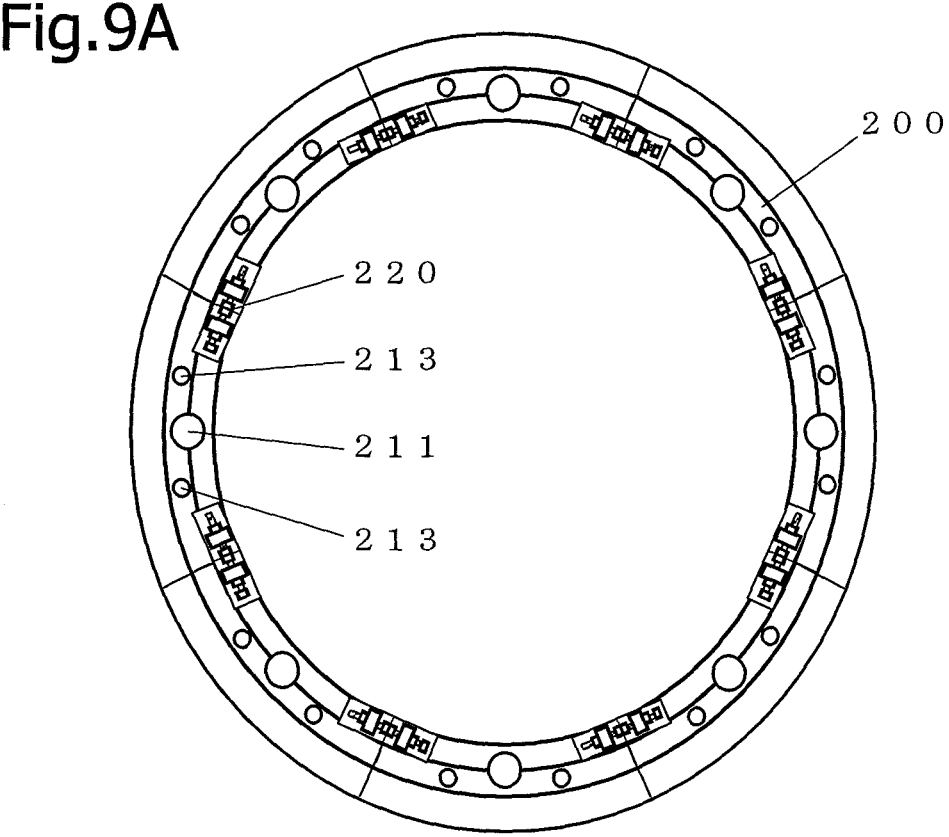
FIG. 9A is a plan view of a giant spinning wheel portion in which a convex plane is formed on the surface side thereof.
Figure 9B:
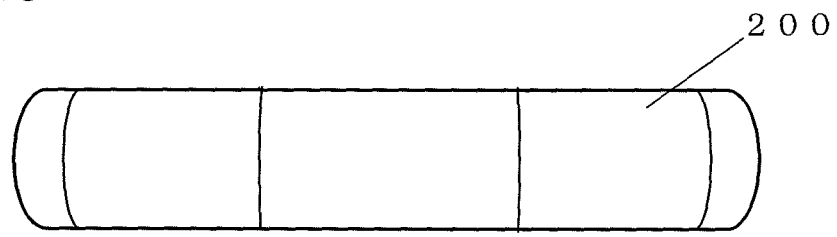
FIG. 9B is a front view of the giant spinning wheel composition in which the convex plane is formed on the surface side thereof.
Figure 10A:
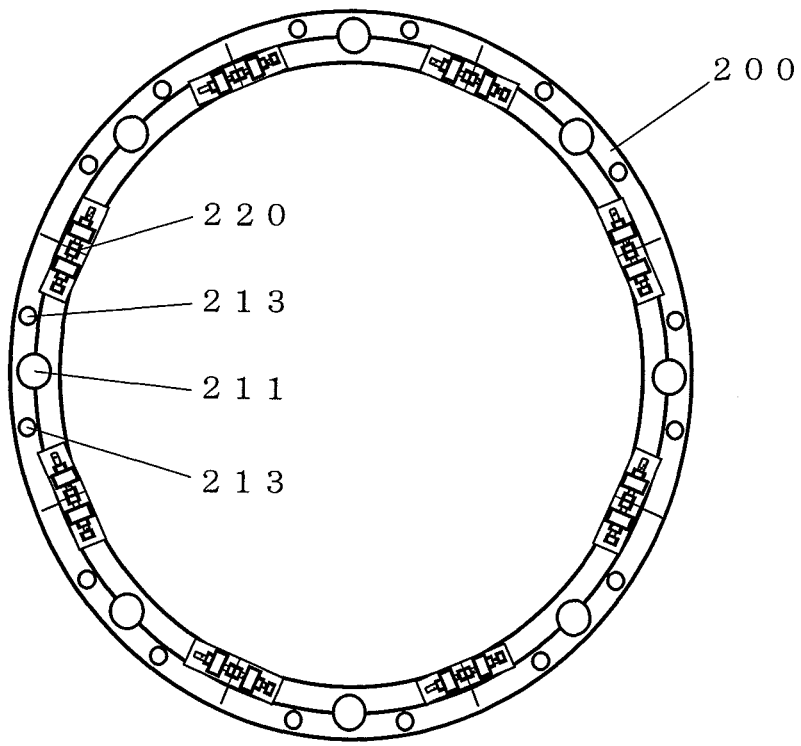
FIG. 10A is a plan view of the giant spinning wheel composition whose appearance side is concaved.
Figure 10B:
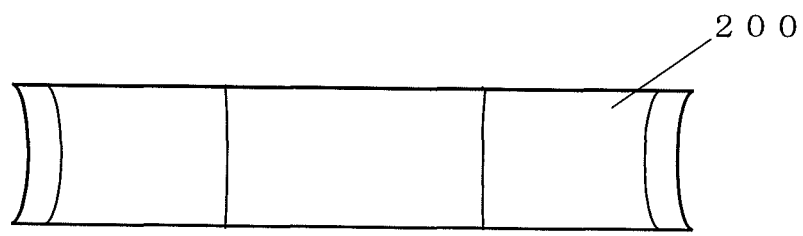
FIG. 10B is a front view of the outer peripheral portion (appearance side) of the giant spinning wheel composition whose appearance side is concaved.
Figure 11A:
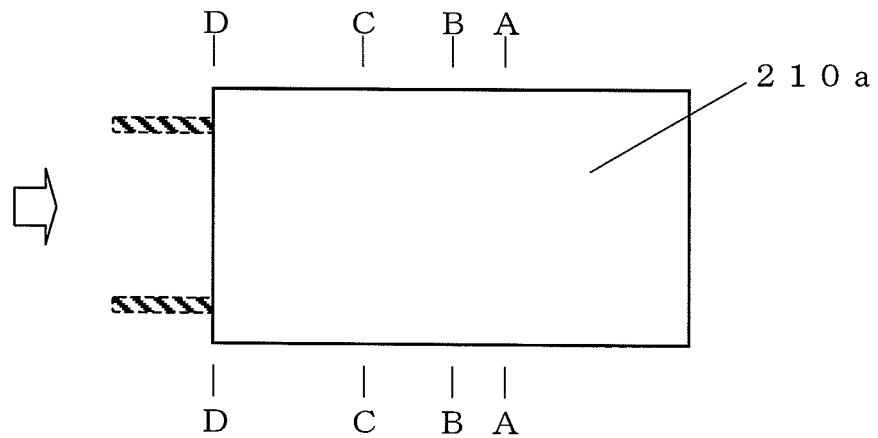
FIG. 11A is a front view of the outer peripheral portion (appearance side) of the giant spinning wheel portion.
Figure 11B:
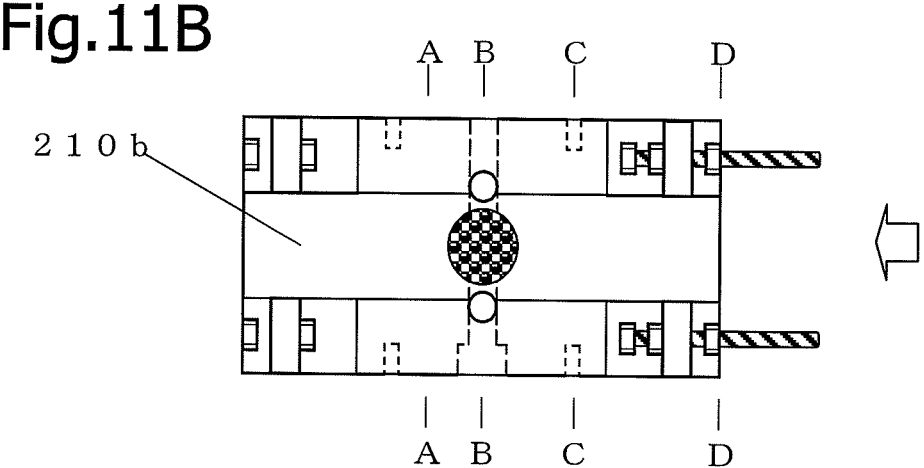
FIG. 11B is a view seen from the inner peripheral portion (inner side) of the giant spinning wheel portion.
Figure 11C:
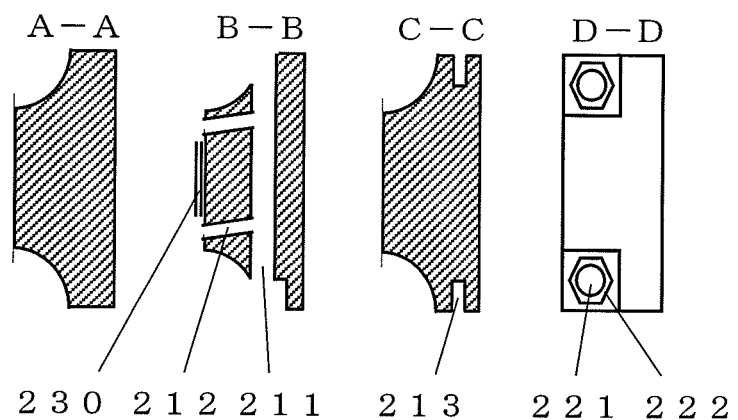
FIG. 11C shows section and side views of the giant spinning wheel portion sectioned at the respective parts.
Figure 12A:
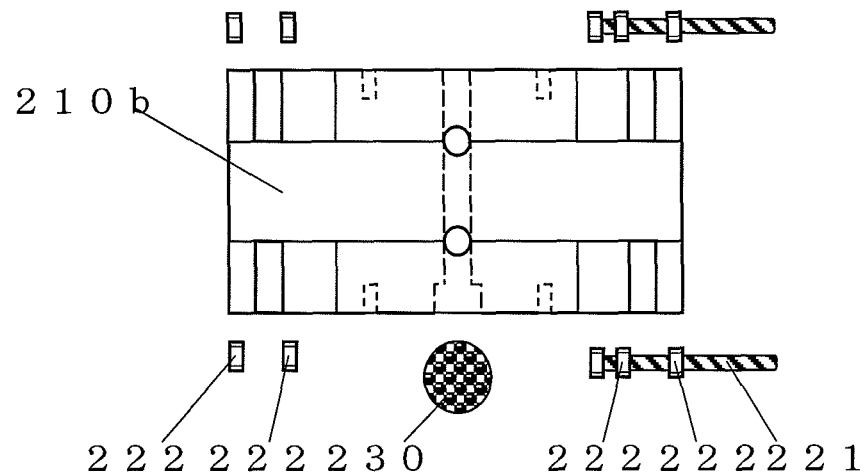
FIG. 12A shows a coupling unit in a state in which bolts, nuts and light wave/laser reflector are removed so that a structure of the coupling unit can be understood. It is noted that although the nut actually used in the coupling unit is used by placing washers on the both sides, they are omitted in the drawing.
Figure 12B:
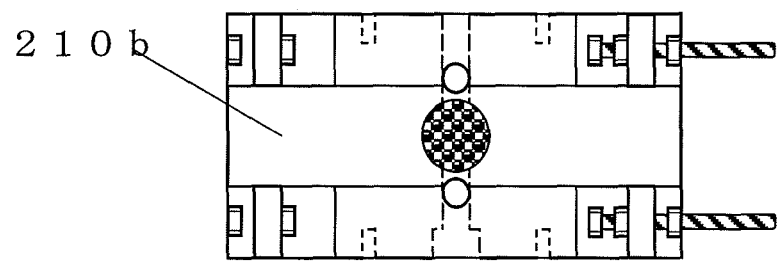
FIG. 12B show the coupling unit of the giant spinning wheel portion in which the bolts and nuts are attached to the coupling unit and the light wave/laser reflector is attached to the center of the part of back side.
Figure 12C:
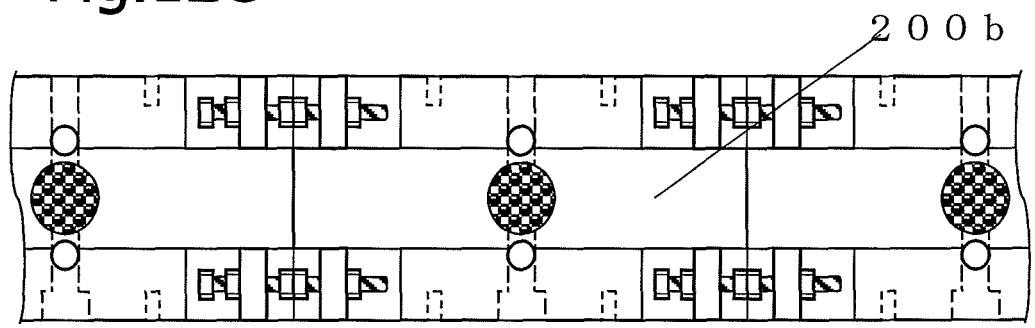
FIG. 12C shows the inner peripheral portion (back side) of the giant spinning wheel composition in which the plurality of adjacent giant spinning wheel portions are coupled respectively by the coupling units.
Figure 13A:
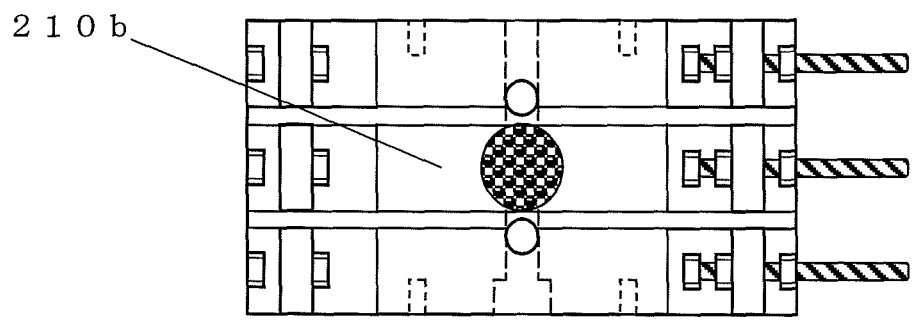
FIG. 13A is a view of the giant spinning wheel portion, seen from the inner peripheral portion (back side), having the coupling units at three points of the side surface thereof.
Figure 13B:
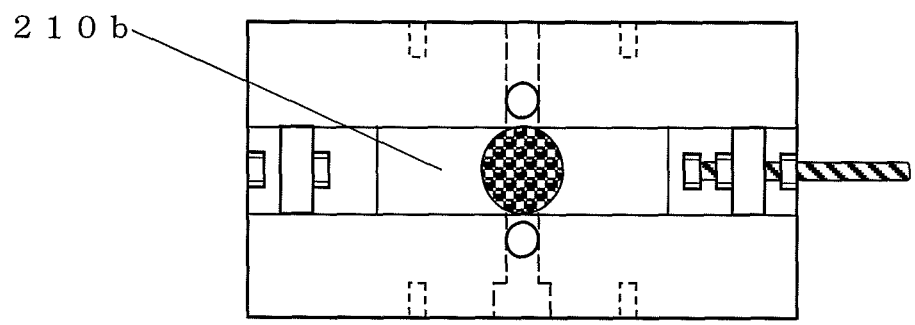
FIG. 13B is a view of the giant spinning wheel portion, seen from the inner peripheral portion (back side), having the coupling unit at one point of the side surface thereof.
Figure 14A:
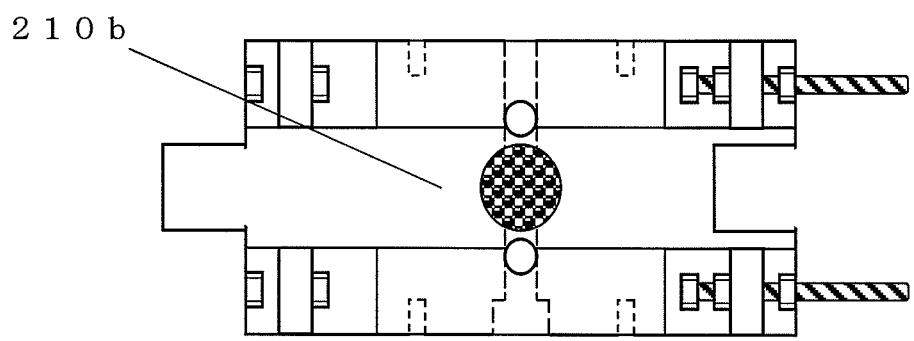
FIG. 14A is a view of the giant spinning wheel portion, seen from the inner peripheral portion (back side) thereof, having convex and concave side surfaces that fit each other among the adjacent side surfaces.
Figure 14B:
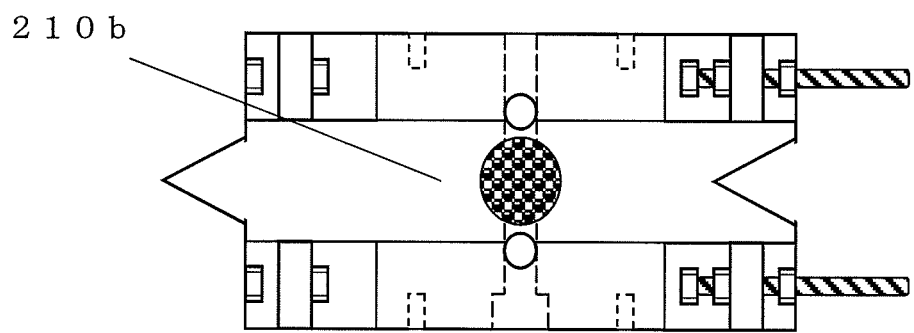
FIG. 14B is a view of the giant spinning wheel portion, seen from the inner peripheral portion (back side) thereof, having triangular side surfaces that fit each other among the adjacent side surfaces.
Figure 15A:
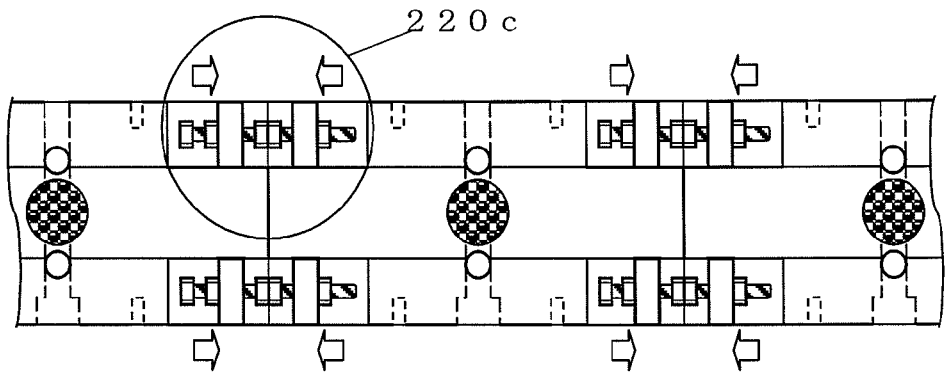
FIG. 15A shows a state in which the giant spinning wheel portions are tightened by manipulating the nut of the coupling unit in the direction of fastening it in assembling the giant spinning wheel.
Figure 15B:
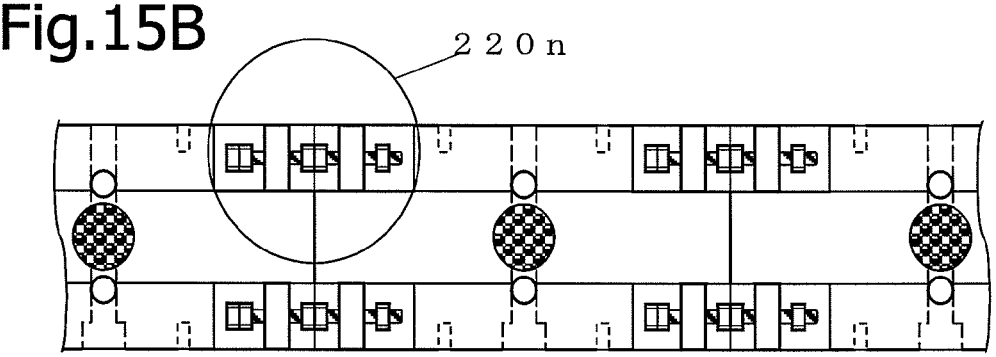
FIG. 15B shows a state in which the nut is set at the neutral position by releasing the tightened state of the coupling unit on the way of winding the thin sheet band around the giant spinning wheel, because the diameter of the giant spinning wheel decreases due to fastening of the thin sheet band as the thin sheet band is wound around the giant spinning wheel.
Figure 15C:
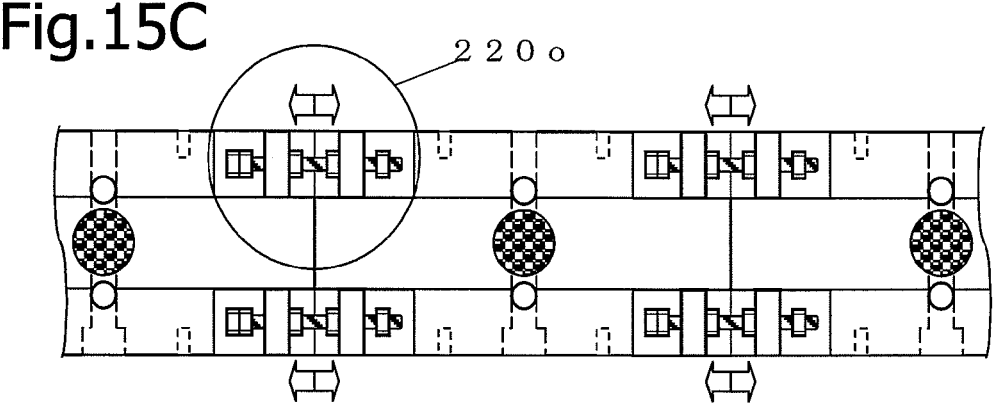
FIG. 15C shows a state in which the adjacent coupling units are forcibly elongated by manipulating the nut of the coupling unit to keep the diameter of the giant spinning wheel constant by compensating the decrease of the diameter of the giant spinning wheel caused by fastening of the thin sheet band as the thin sheet band is wound around the giant spinning wheel.
Figure 16A:
FIG. 16A shows the part of appearance side of the giant spinning wheel composition.
Figure 16B:
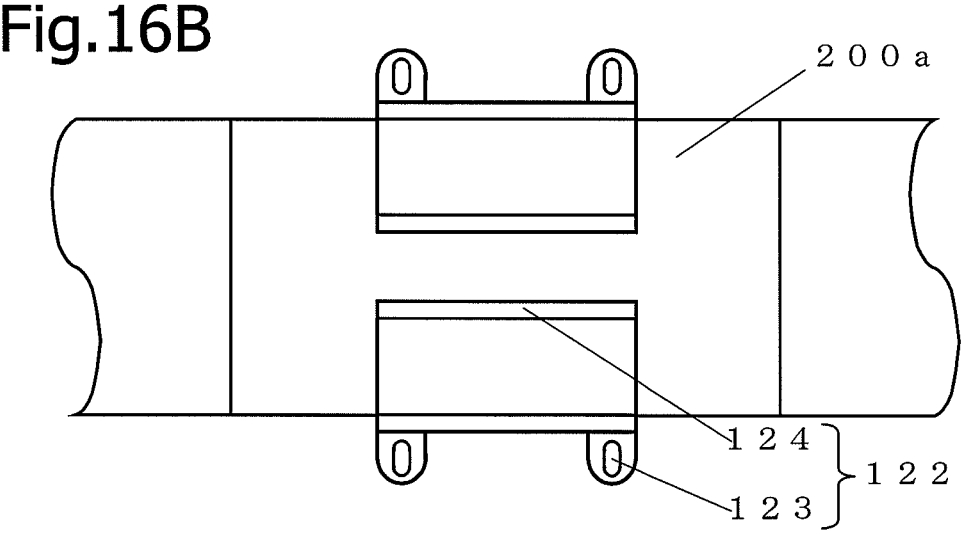
FIG. 16B shows a state in which a set of two starting and ending point flaps for a ring are applied to the part of appearance side of the giant spinning wheel composition.
Figure 16C:
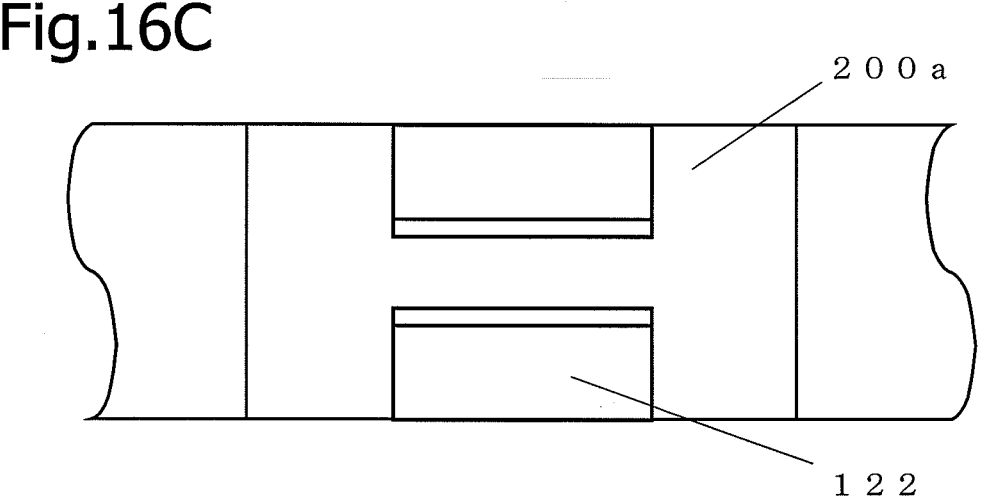
FIG. 16C shows a state in which the set of two starting and ending point flaps for the ring are anchored and set to the part of appearance side of the giant spinning wheel composition.
Figure 17A:
FIG. 17A shows the giant spinning wheel composition seen from the part of appearance side thereof.
Figure 17B:
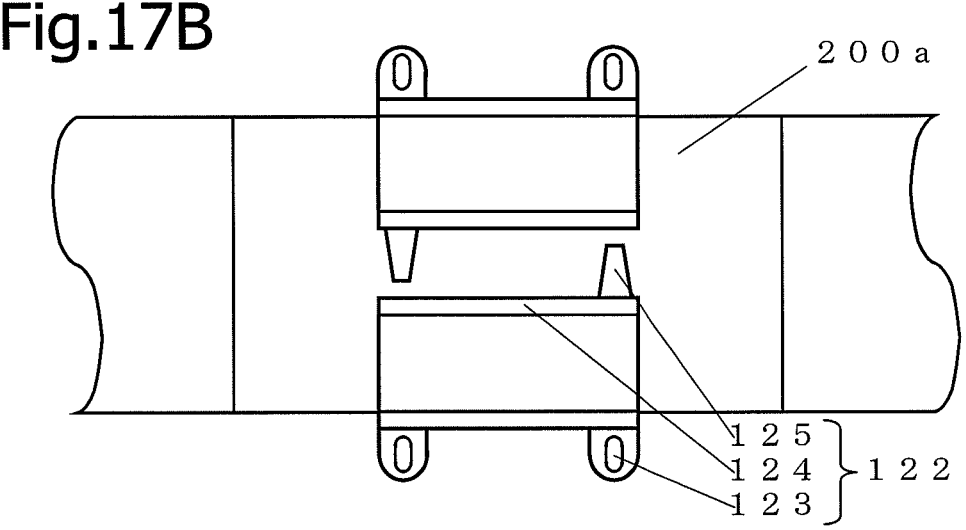
FIG. 17B shows a state in which a set of two starting and ending point flaps for a ring having welding electrodes are applied to the part of appearance side of the giant spinning wheel composition.
Figure 17C:
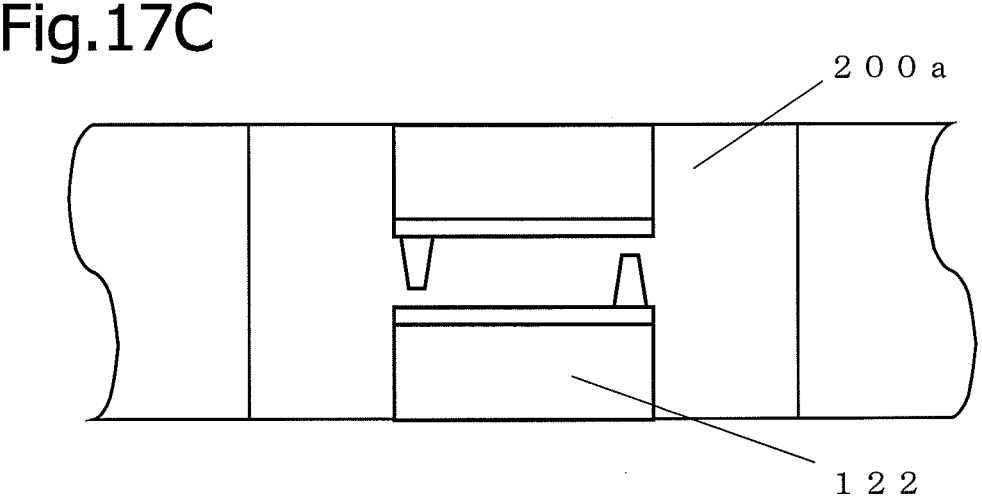
FIG. 17C shows a state in which a set of two starting and ending point flaps for a ring having welding electrodes are anchored and set to the part of appearance side of the giant spinning wheel composition.
Figure 18A:
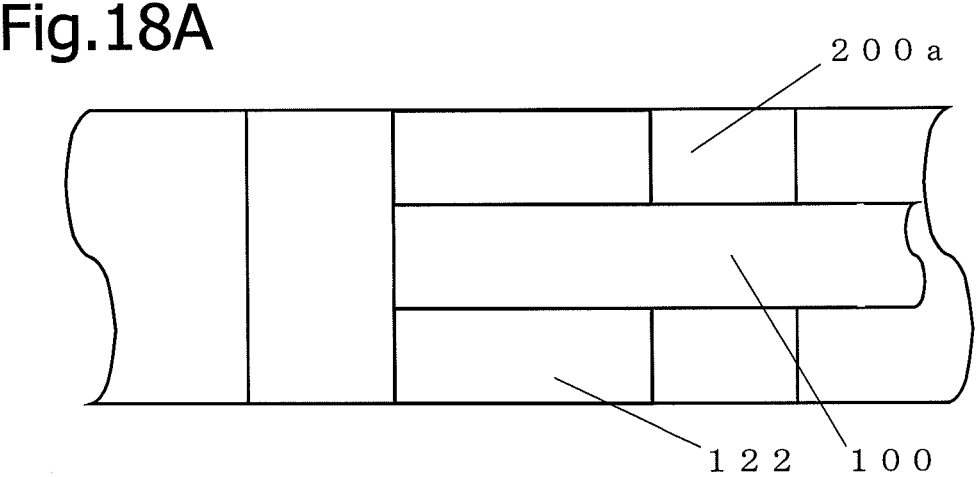
FIG. 18A shows a state in which the starting point of the thin sheet band is joined to the set of two starting and ending point flaps for a ring to start spinning of the thin sheet band around the giant spinning wheel composition.
Figure 18B:
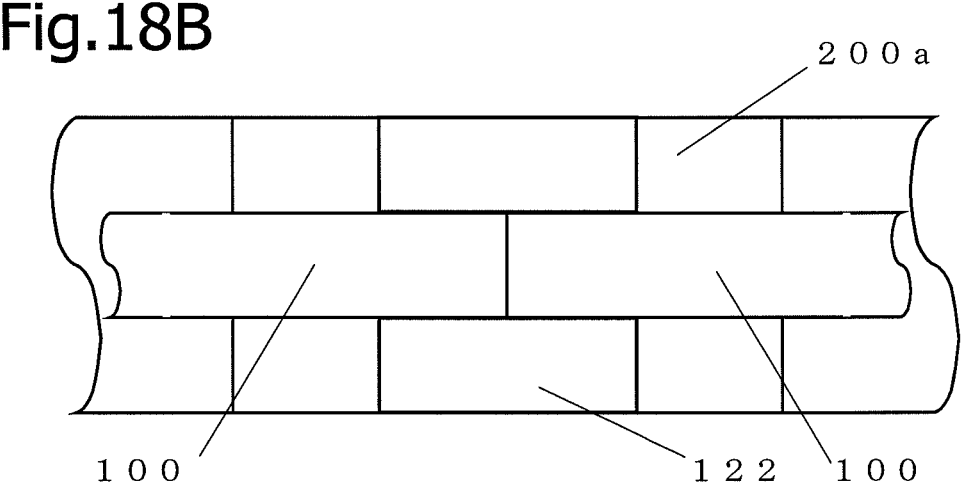
FIG. 18B shows a state in which one spinning of a different type of thin sheet band is finished on the way of spinning by the set of two starting and ending point flaps for a ring set on the giant spinning wheel composition and in which spinning of the other is started.
Figure 18C:
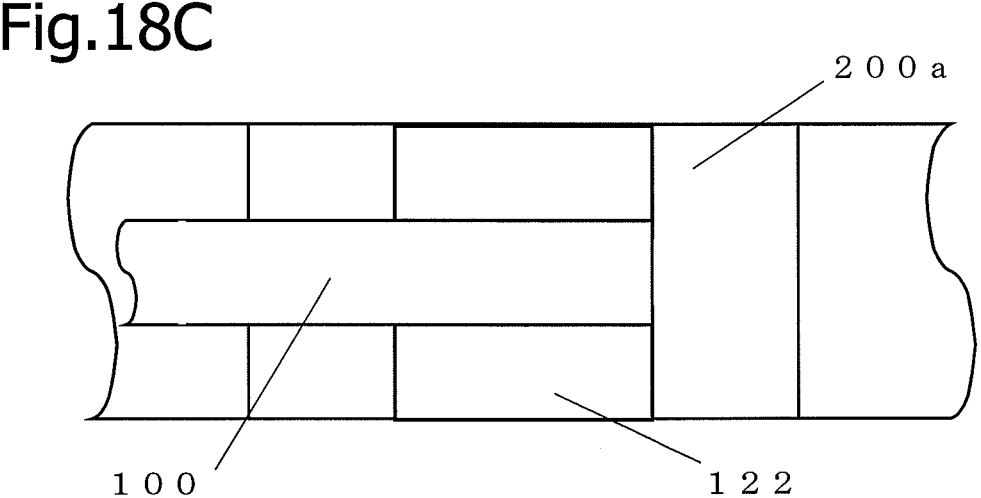
FIG. 18C shows a state in which spinning of the thin sheet band by the set of two starting and ending point flaps on the giant spinning wheel composition is finished.
Figure 19A:
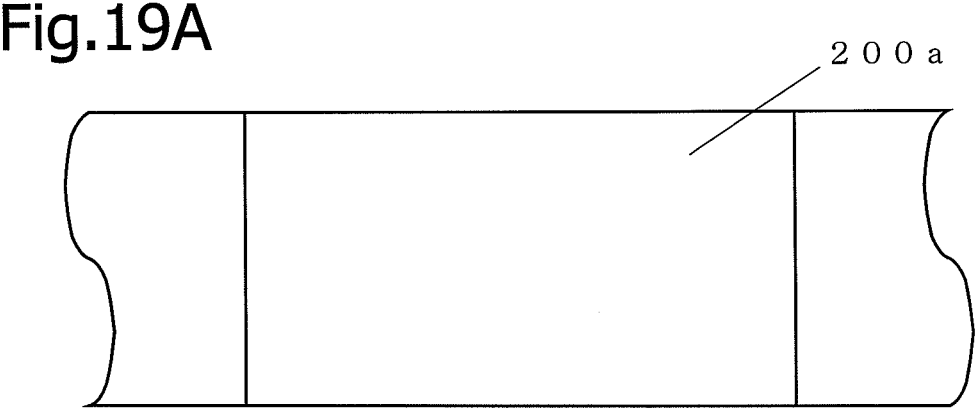
FIG. 19A shows the giant spinning wheel composition seen from the part of appearance side.
Figure 19B:
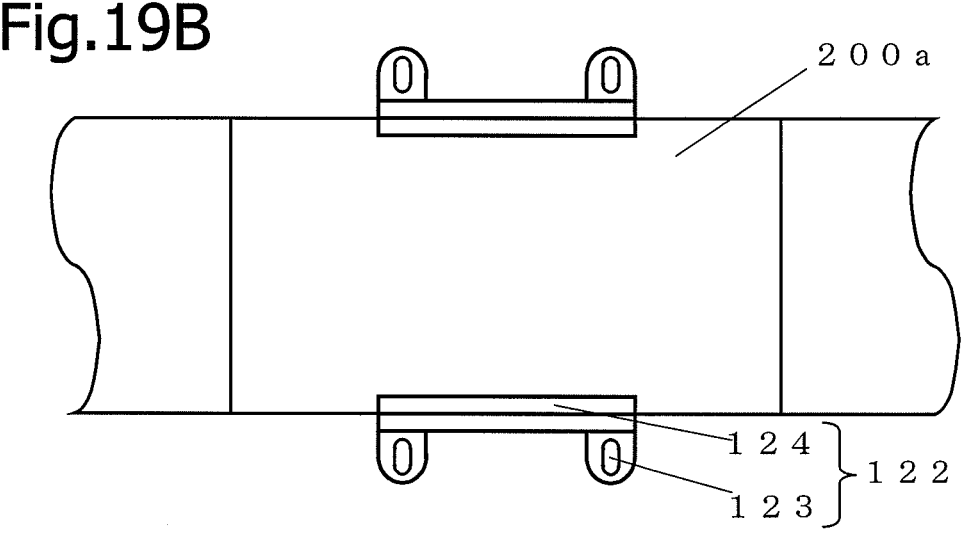
FIG. 19B shows a state in which a set of two starting and ending point flaps for a rotatable duct or shroud are applied to the part of appearance side of the giant spinning wheel composition.
Figure 19C:
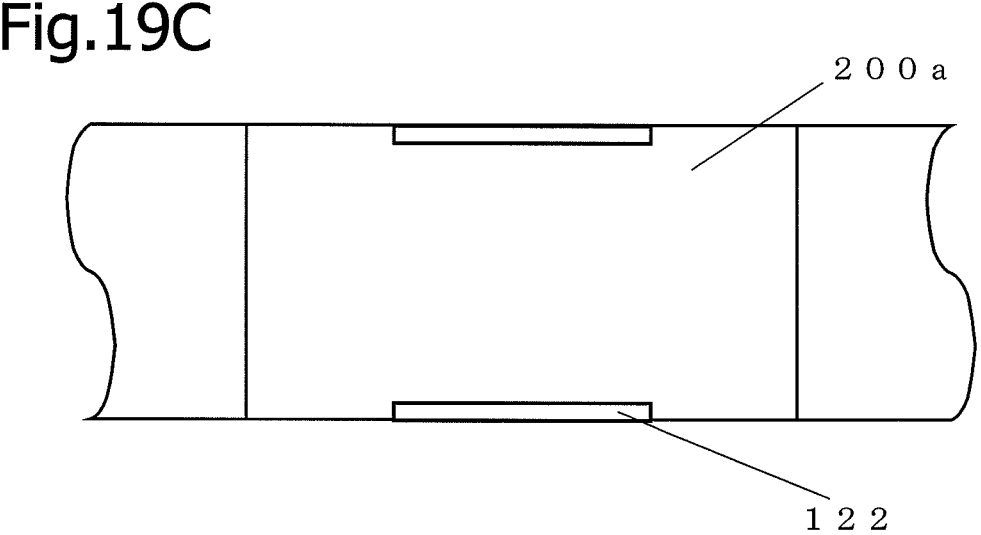
FIG. 19C shows a state in which the set of two starting and ending point flaps for the rotatable duct or shroud are anchored and set to the part of appearance side of the giant spinning wheel composition.
Figure 20A:
FIG. 20A shows the giant spinning wheel composition seen from the part of appearance side.
Figure 20B:
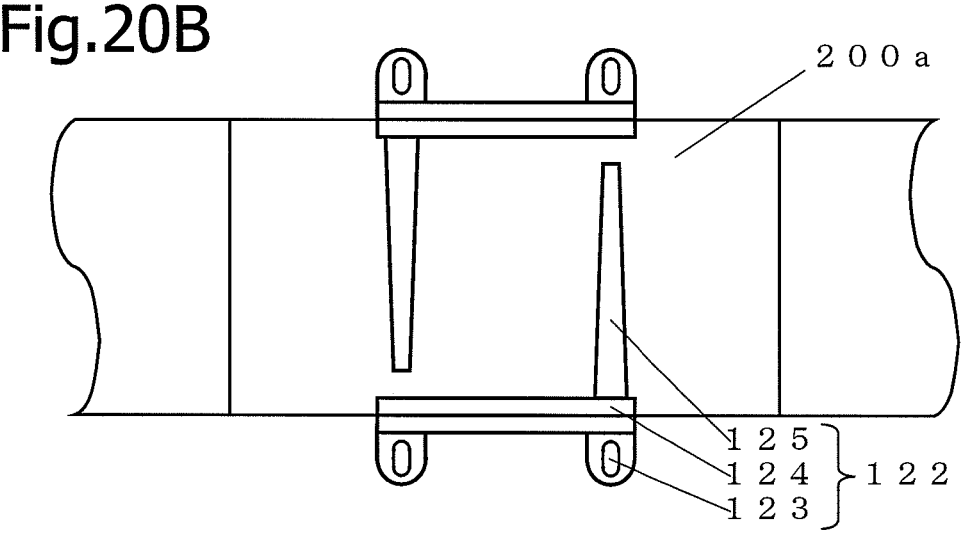
FIG. 20B shows a state in which a set of two starting and ending point flaps for a rotatable duct or shroud having welding electrodes are applied to the part of appearance side of the giant spinning wheel composition.
Figure 20C:
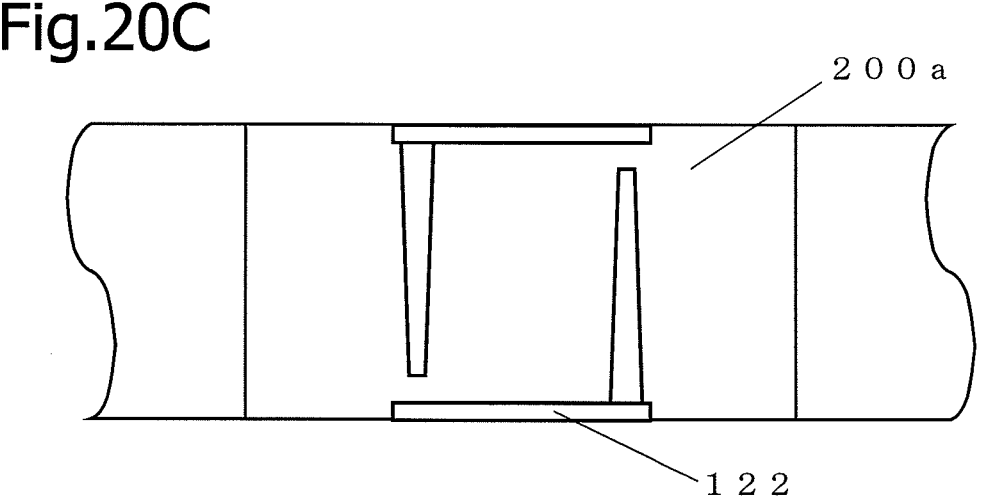
FIG. 20C shows a state in which the set of two starting and ending point flaps for the rotatable duct or shroud having the welding electrodes are anchored and set to the part of appearance side of the giant spinning wheel composition.
Figure 21A:
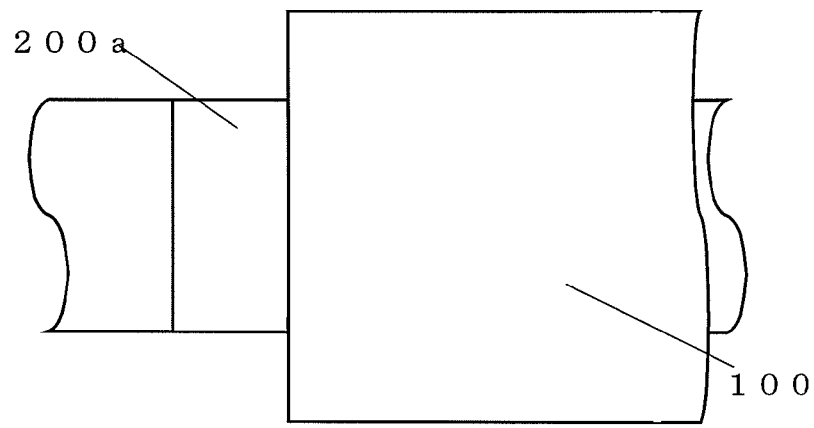
FIG. 21A shows a state in which the starting point of the thin sheet band is joined to the set of two starting and ending point flaps for a rotatable duct or shroud to start spinning of the thin sheet band around the giant spinning wheel composition.
Figure 21B:
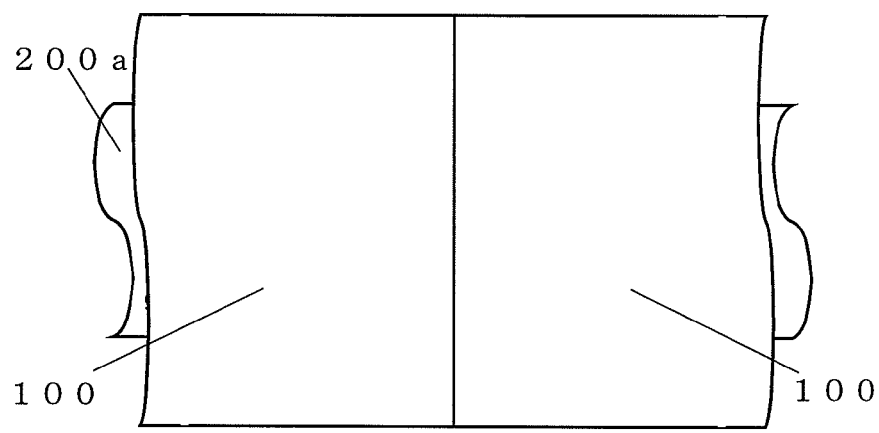
FIG. 21B shows a state in which one spinning of a different type of thin sheet band is finished by the set of two starting and ending point flaps for the rotatable duct or shroud set on the giant spinning wheel composition and in which spinning of the other is started.
Figure 21C:
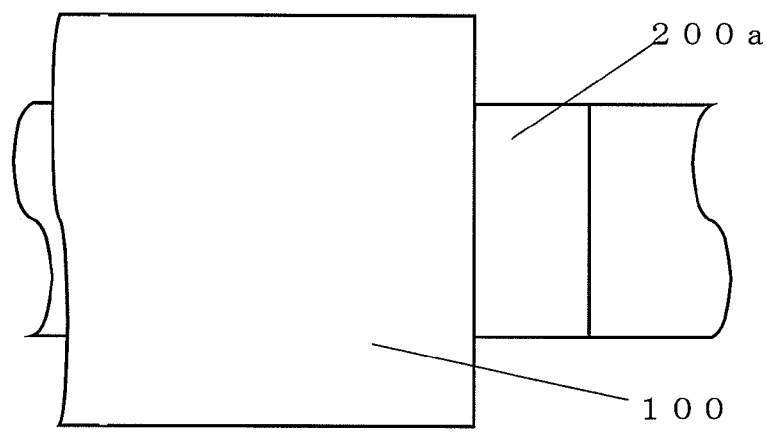
FIG. 21C shows a state in which spinning of the thin sheet band by the set of two starting and ending point flaps for the rotatable duct or shroud on the giant spinning wheel composition is finished.
Figure 22A:
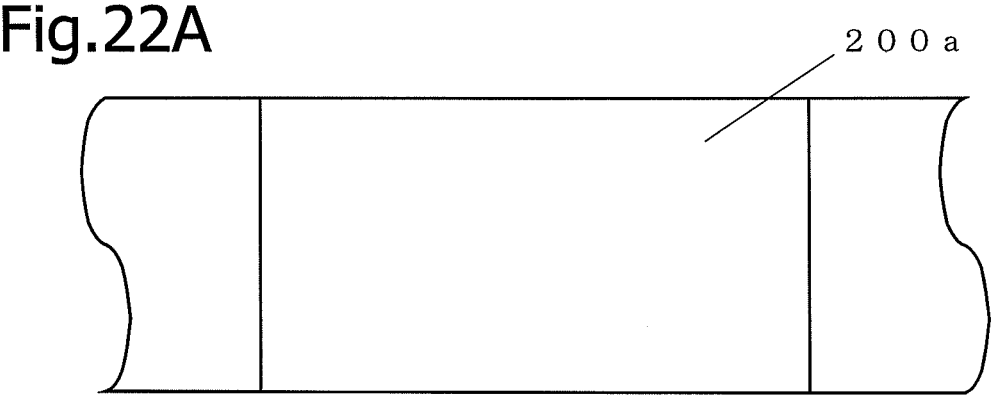
FIG. 22A shows the giant spinning wheel composition seen from the part of appearance side.
Figure 22B:
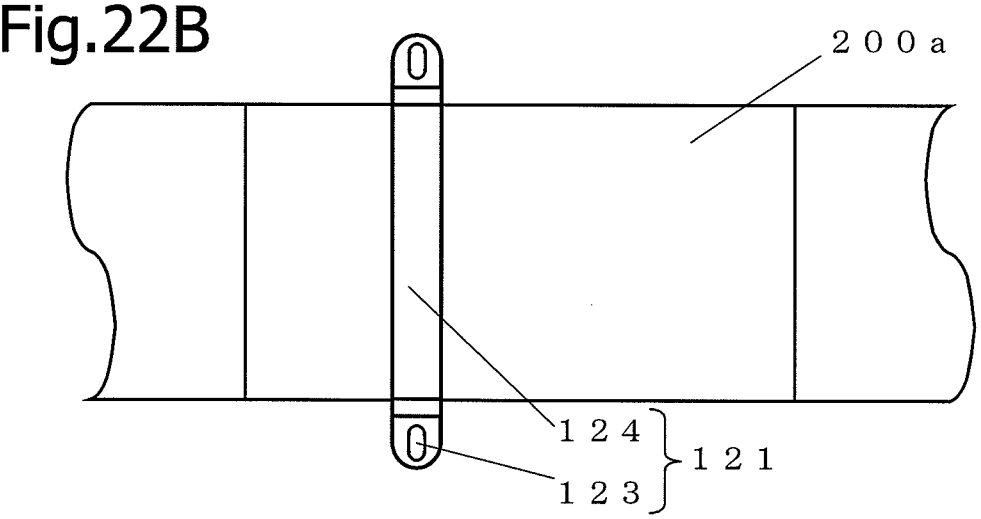
FIG. 22B shows a state in which the set of two starting and ending point flaps are applied to the part of appearance side of the giant spinning wheel composition.
Figure 22C:
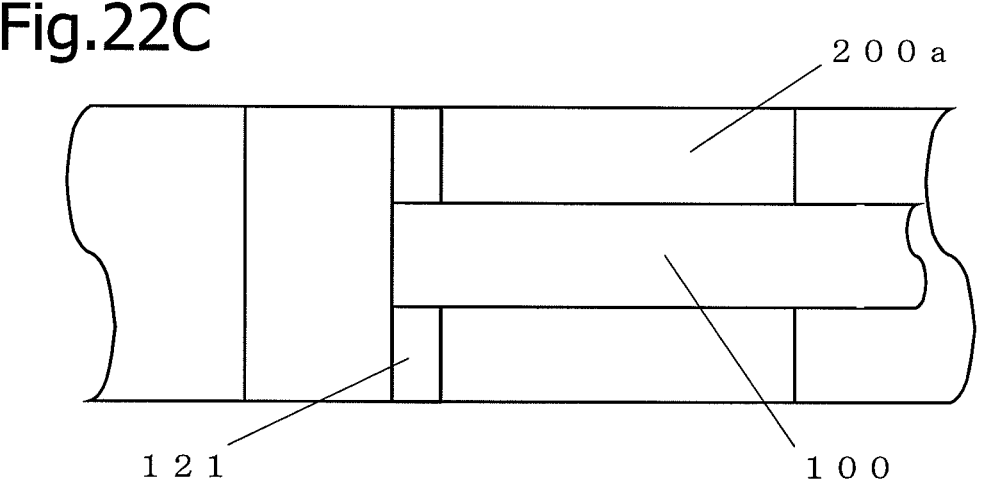
FIG. 22C shows a state in which the set of two starting and ending point flaps are anchored and set to the part of appearance side of the giant spinning wheel composition and the starting point of the thin sheet band is joined to start spinning of the thin sheet band around the giant spinning wheel composition.
Figure 23A:
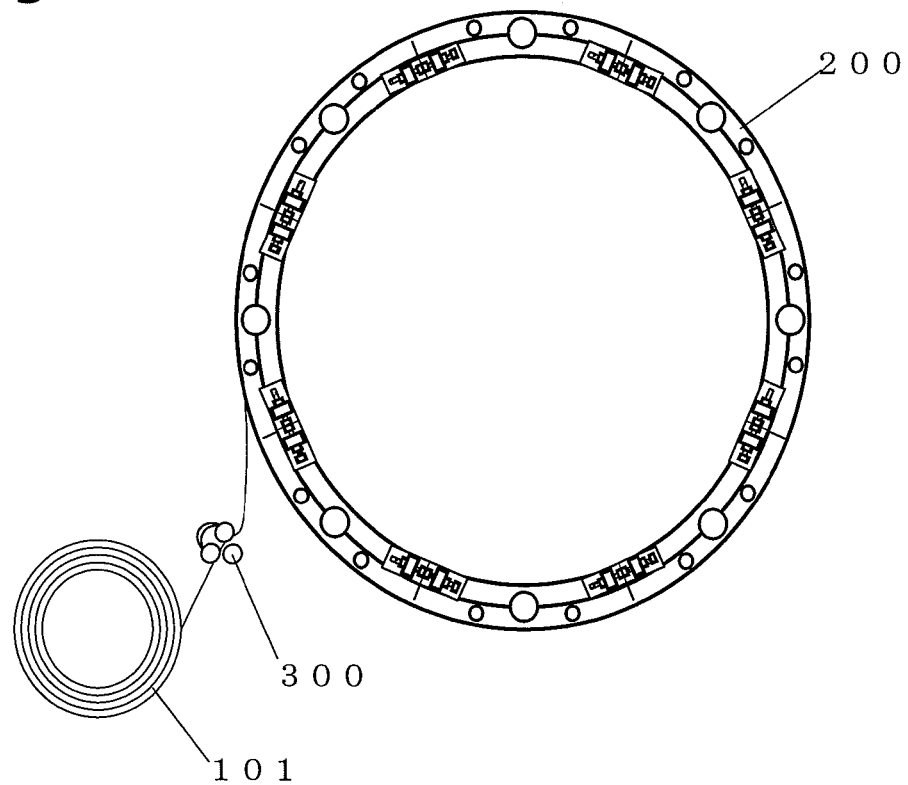
FIG. 23A is a plan view of the coiled thin sheet band for a ring, the giant spinning wheel composition and a tension controller for adjusting spinning of the thin sheet band seen from above their installation places.
Figure 23B:
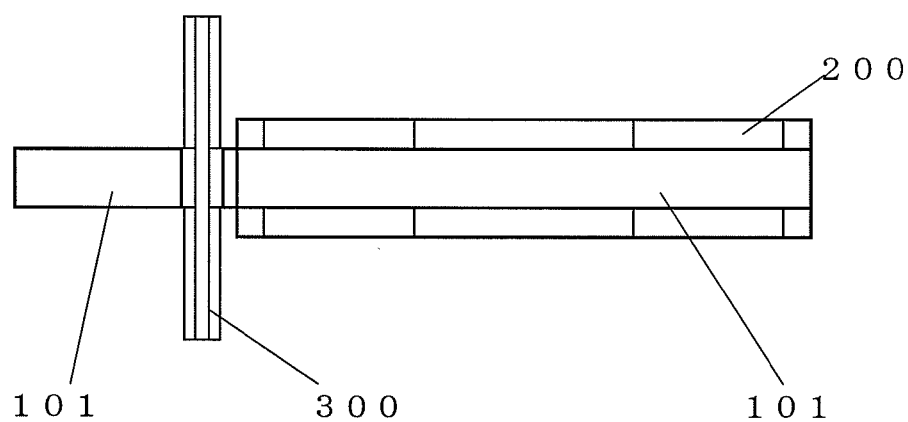
FIG. 23B is a front view, seen from the horizontal position, showing a state when the thin sheet band for a ring having no mesh is spun around the giant spinning wheel composition.
Figure 24A:
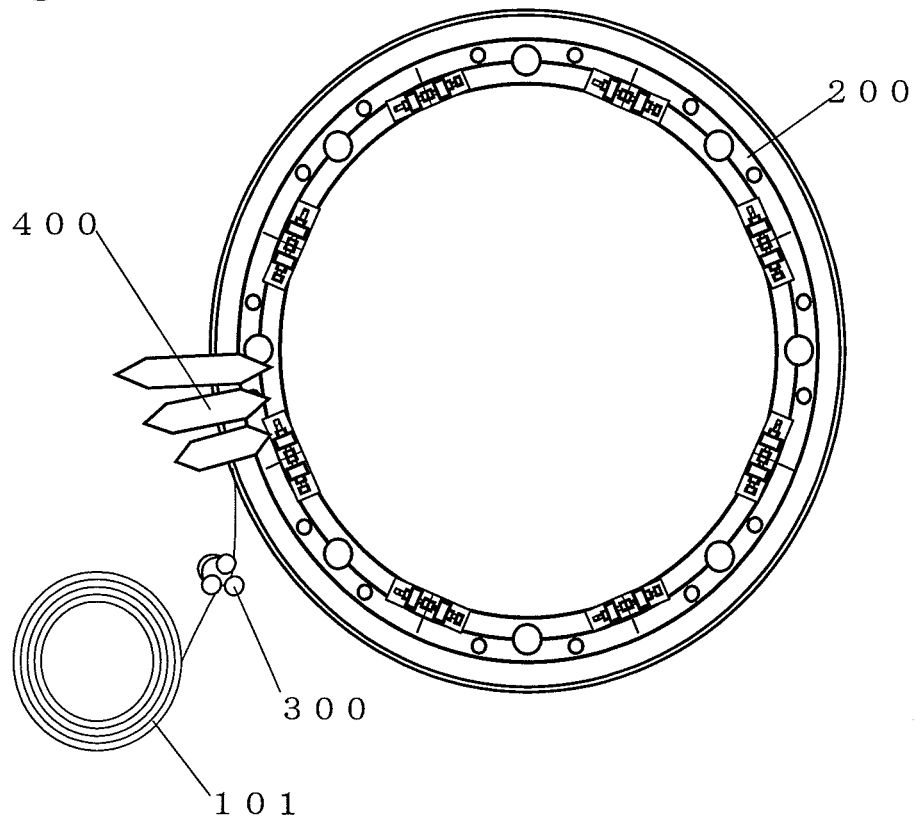
FIG. 24A is a plan view of the coiled thin sheet band for a rotatable duct, the giant spinning wheel composition and the tension controller for adjusting spinning of the thin sheet band seen from above their installation places.
Figure 24B:
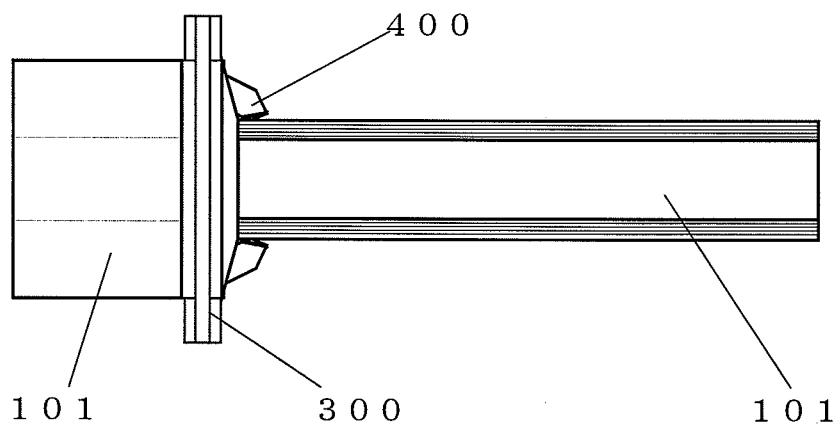
FIG. 24B is a front view, seen from the horizontal position, showing a state in which the thin sheet band for the rotatable duct having no mesh is spun around the giant spinning wheel composition.
Figure 25A:
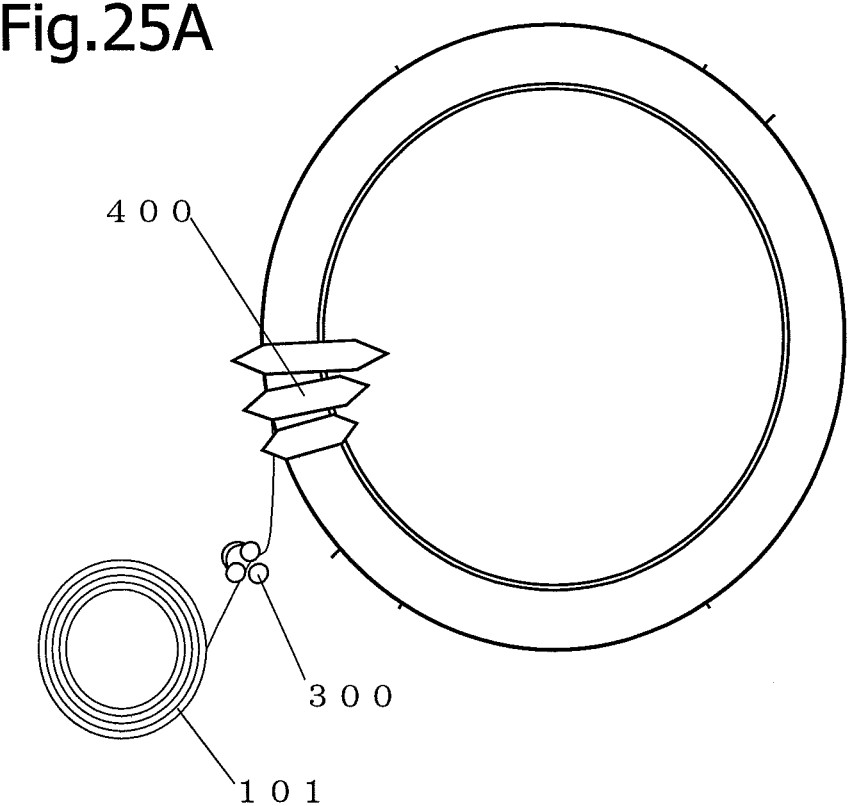
FIG. 25A is a plan view of the coiled thin sheet band for a shroud, the giant spinning wheel composition and the tension controller for adjusting spinning of the thin sheet band seen from above their installation places.
Figure 25B:
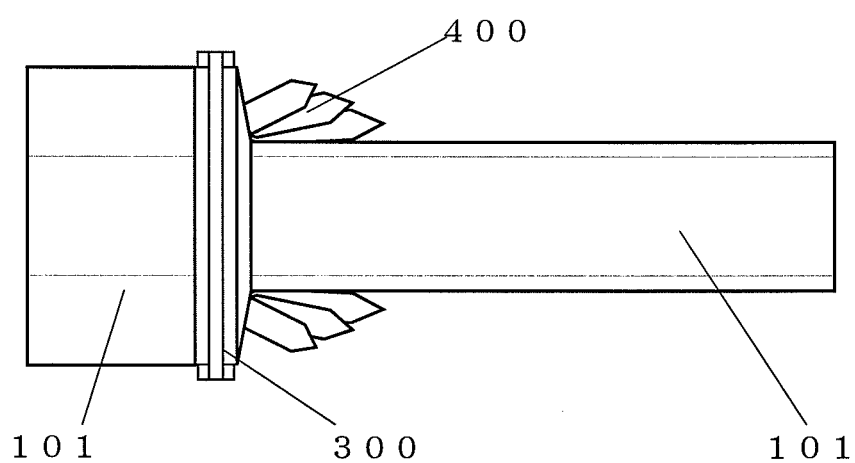
FIG. 25B is a front view, seen from the horizontal position, showing a state in which the thin sheet band for the shroud having no mesh is spun around the giant spinning wheel composition.
Figure 26A:
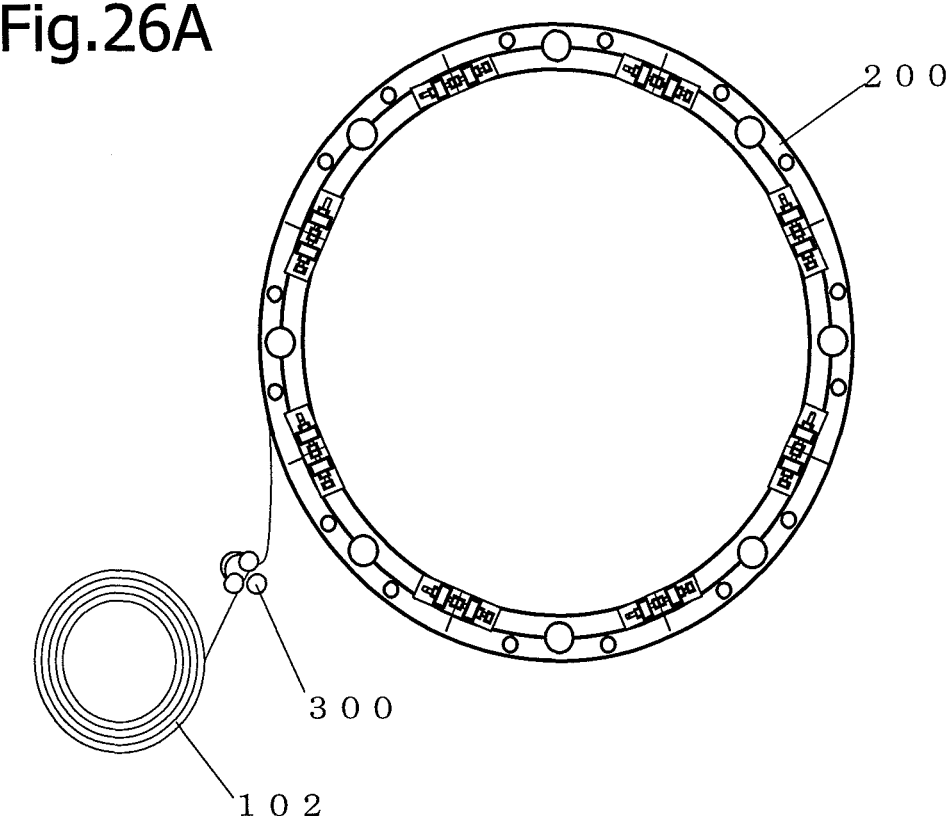
FIG. 26A is a plan view of the coiled thin sheet band for a ring, the giant spinning wheel composition and the tension controller for adjusting spinning of the thin sheet band seen from above their installation places.
Figure 26B:
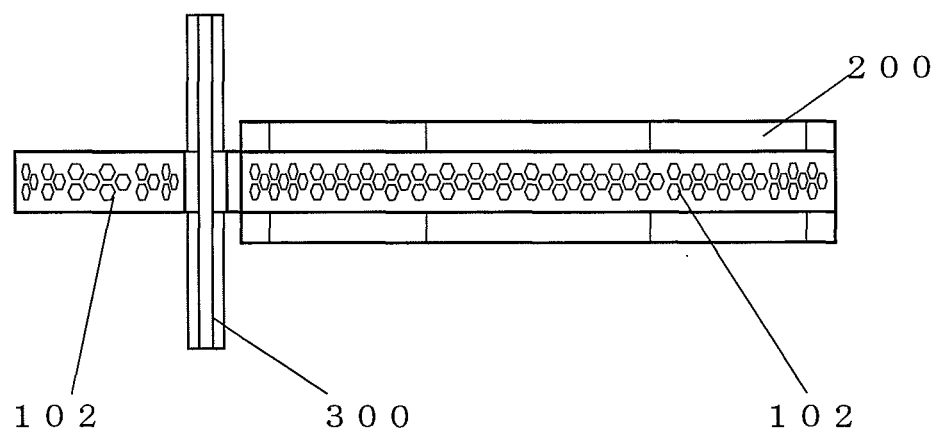
FIG. 26B is a front view, seen from the horizontal position, showing a state in which the thin sheet band for a ring having no mesh is spun around the giant spinning wheel composition.
Figure 27A:
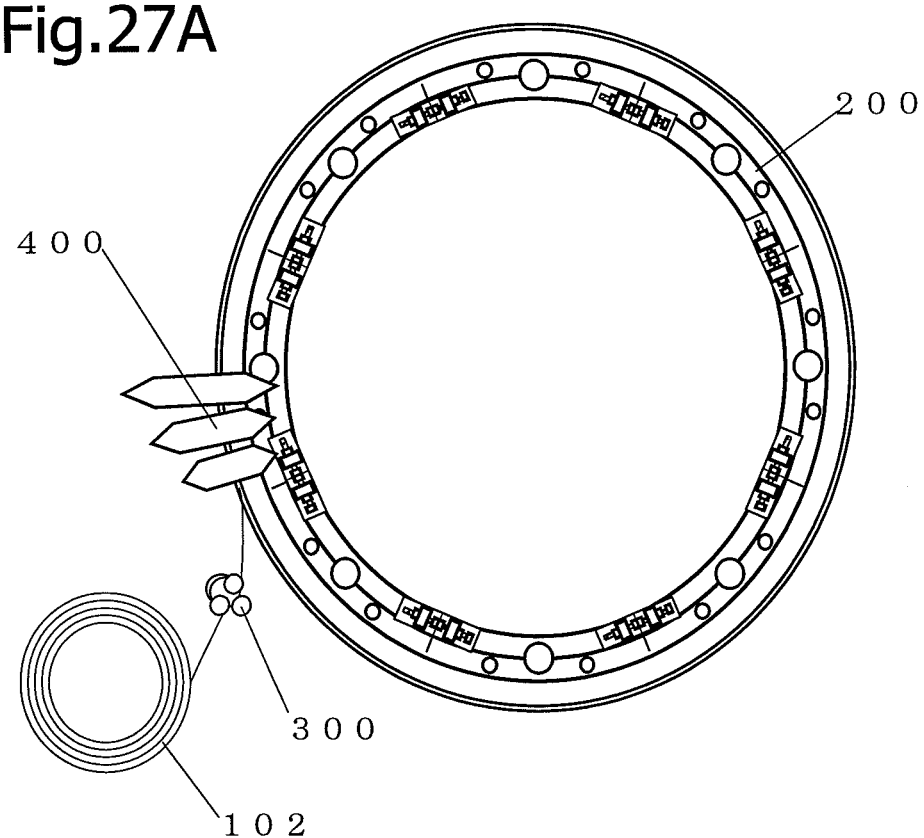
FIG. 27A is a plan view of the coiled thin sheet band for the rotatable duct, the giant spinning wheel composition and the tension controller for adjusting spinning of the thin sheet band seen from above their installation places.
Figure 27B:
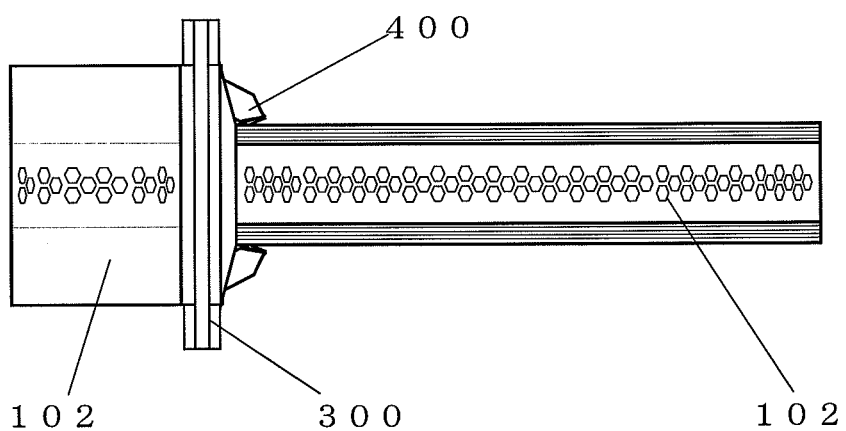
FIG. 27B is a front view, seen from the horizontal position, showing a state in which the thin sheet band for the rotatable duct having mesh is spun around the giant spinning wheel composition.
Figure 28A:
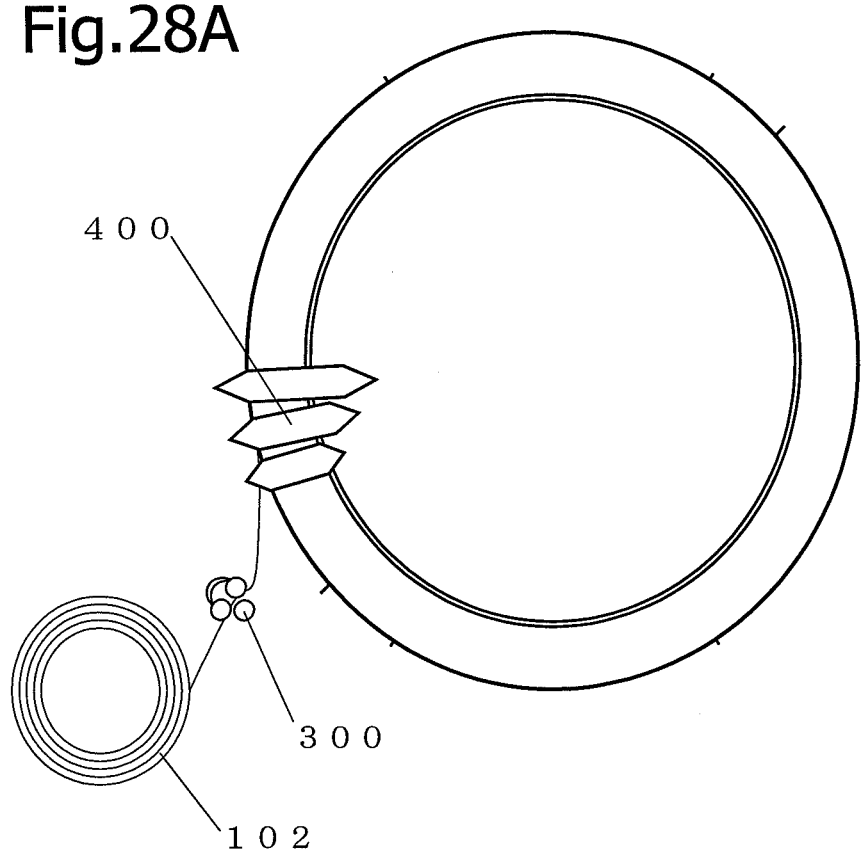
FIG. 28A is a plan view of the coiled thin sheet band for a ring, the giant spinning wheel composition and the tension controller for adjusting spinning of the thin sheet band seen from above their installation places.
Figure 28B:
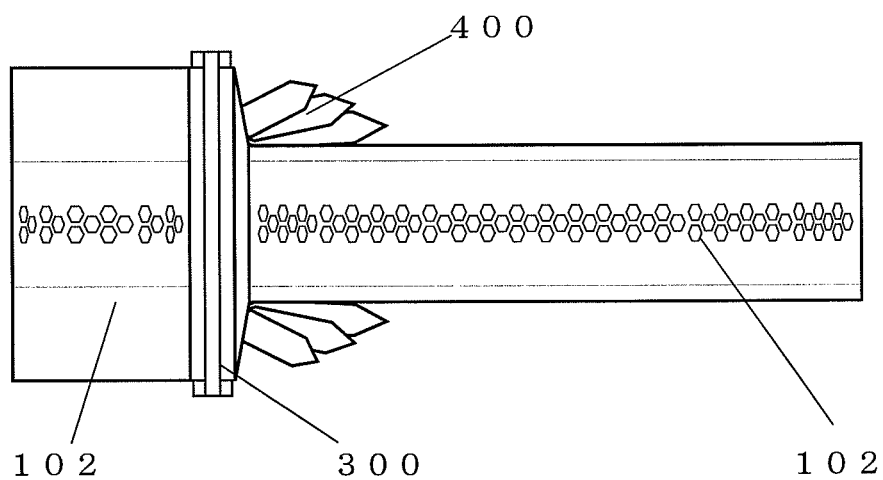
FIG. 28B is a front view, seen from the horizontal position, showing a state in which the thin sheet band for the shroud having mesh is spun around the giant spinning wheel composition.
Figure 29:
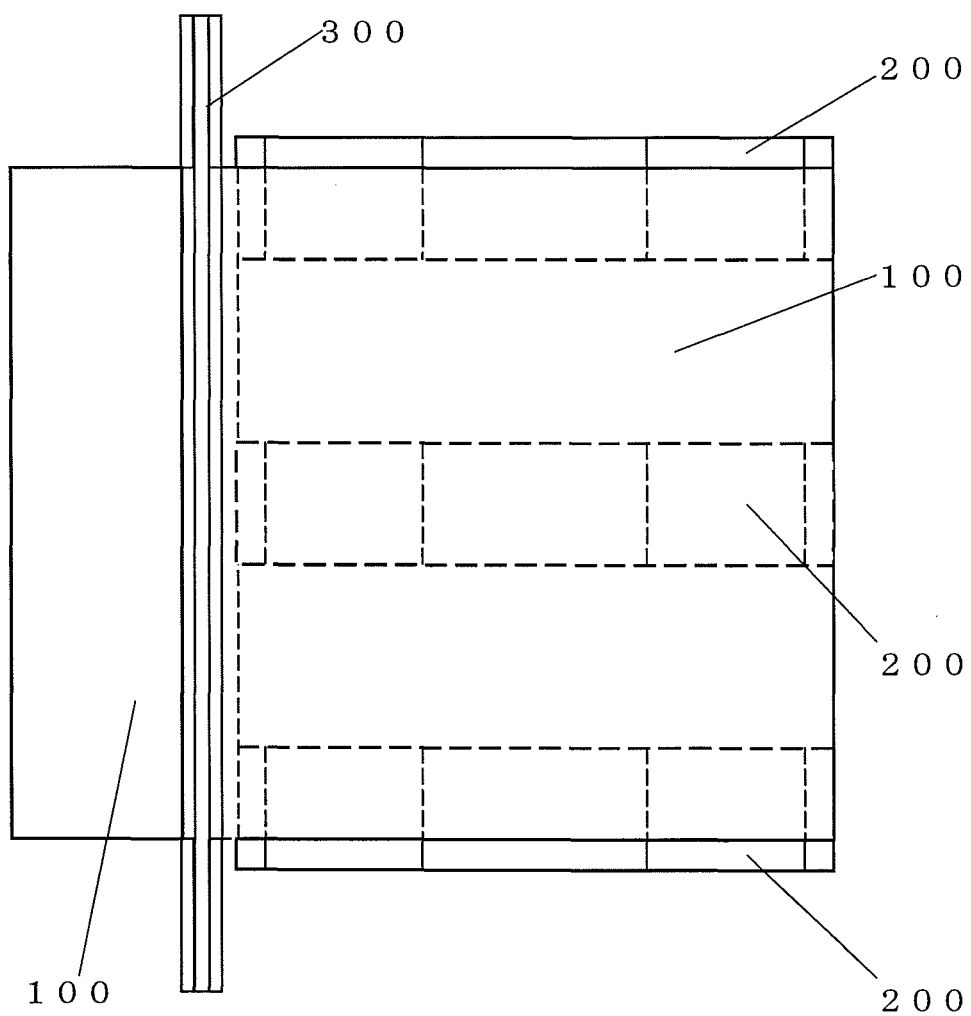
FIG. 29 shows a state in which three giant spinning wheels whose diameters are equal are arrayed by adjusting their central shafts as an example when two or more giant spinning wheels are used when the longitudinal plate portion that runs in parallel with the diametric center shaft is long like the cylindrical external wall. It is also possible to fabricate the cylindrical external wall by using a plurality of giant spinning wheels having different diameters and by shaping by rollers.
Figure 30A:
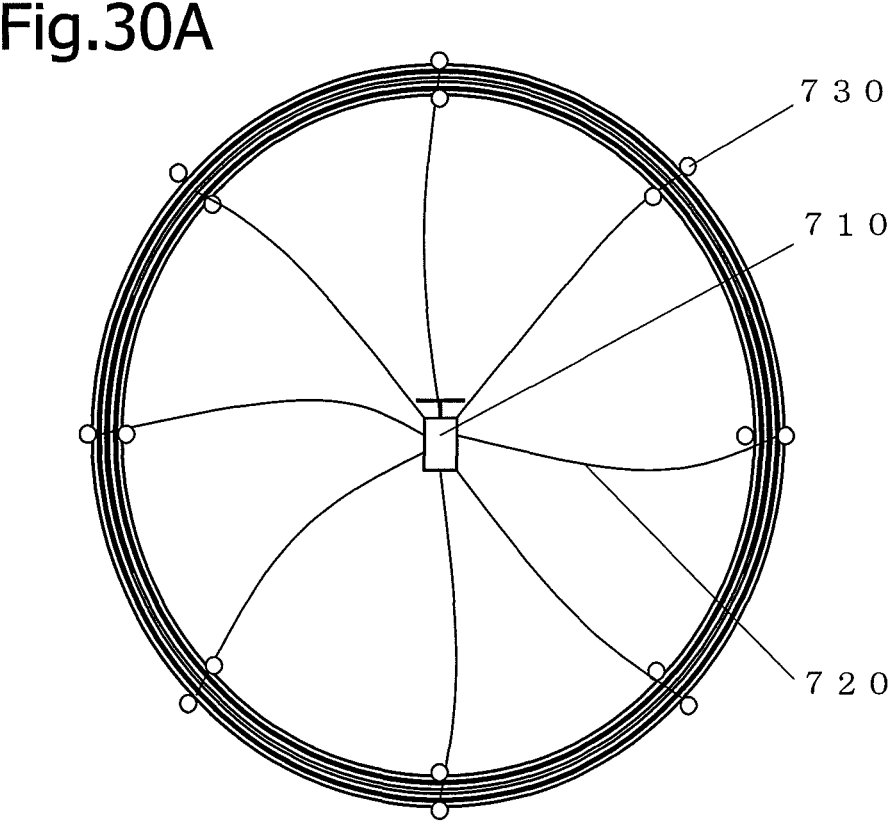
FIG. 30A is a plan view, seen from above, showing a state in which explosive pressure-welding (explosive bonding) is carried out by pasting clayey explosives on the periphery and back sides of the ring, rotatable duct, shroud or cylindrical external wall which has been wound, by attaching a plurality of electric detonators on the circle and by igniting in the same time.
Figure 30B:
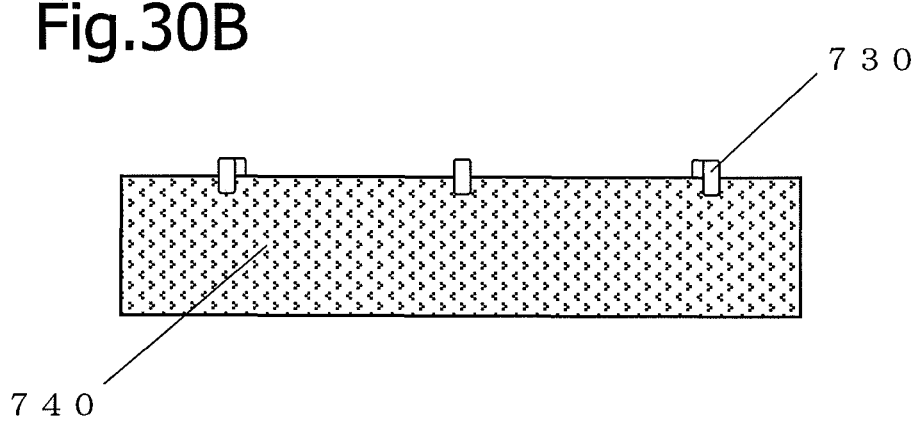
FIG. 30B is a front view, seen from the horizontal direction, showing a state in which the explosive pressure-welding (explosive bonding) is carried out by pasting the clayey explosives on the periphery and back sides of the ring, rotatable duct, shroud or cylindrical external wall which has been wound, by attaching the plurality of electric detonators on the circle and by igniting in the same time.
Figure 31A:
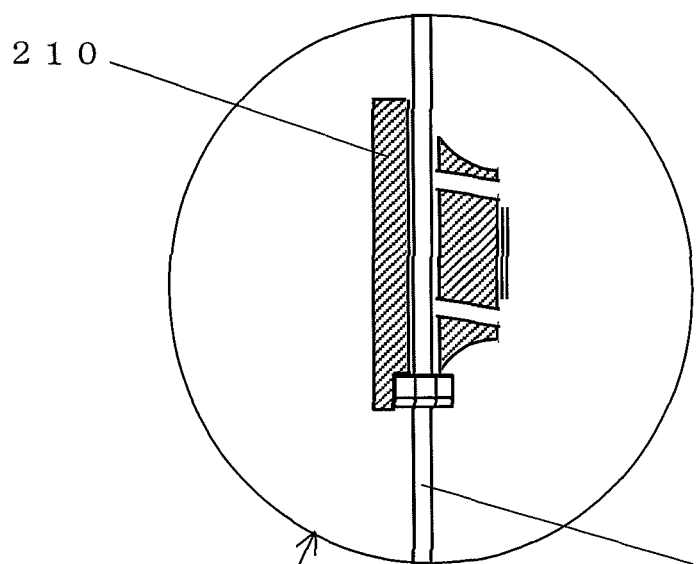
FIG. 31A is an enlarged section view showing a state of use of a pillar of the pillar unit used as a work environment in winding the thin sheet band for the ring around the giant spinning wheel composition.
Figure 31B:
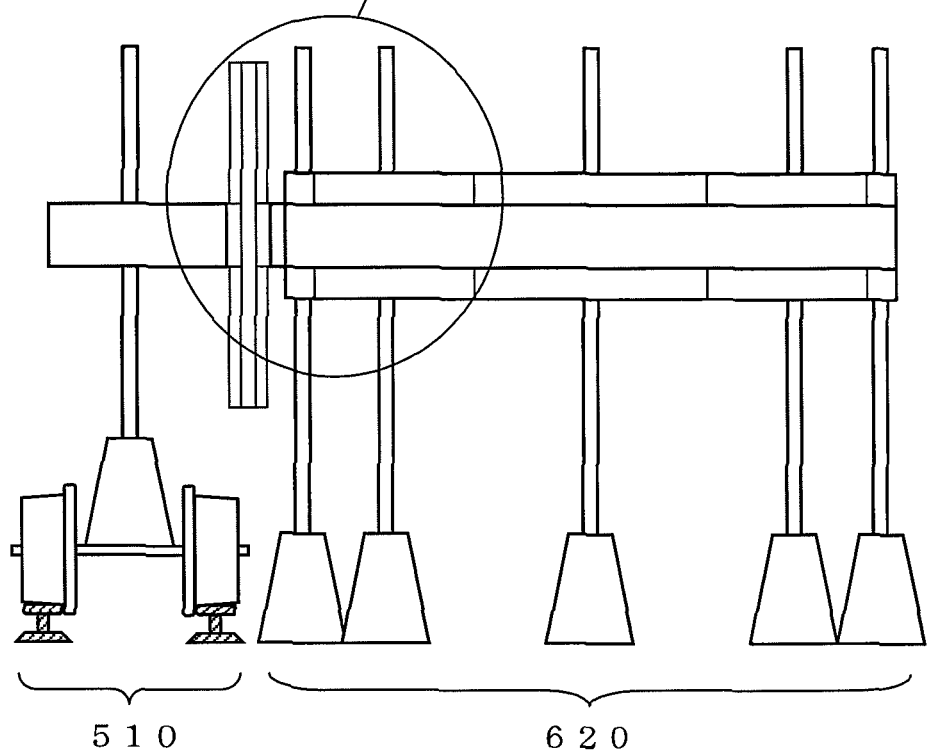
FIG. 31B shows a relationship between a thin sheet band coil table and the pillar unit used as the work environment in winding the thin sheet band around the giant spinning wheel composition, in which the thin sheet band coil table is movable and the pillar unit is stationary (though it can be finely adjusted).
Figure 32A:
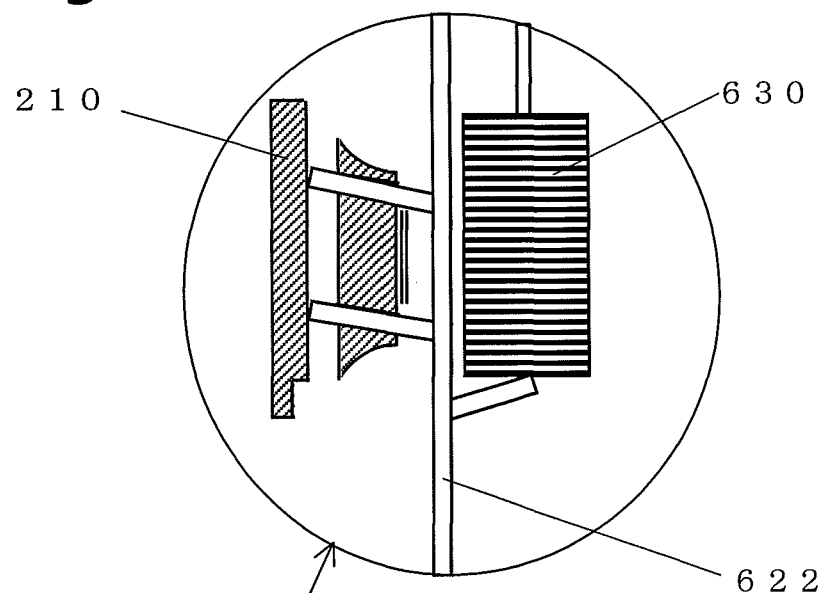
FIG. 32A is an enlarged section view showing a state of use of the pillar of the pillar unit used as the work environment in winding the thin sheet band for the rotatable duct around the giant spinning wheel composition.
Figure 32B:
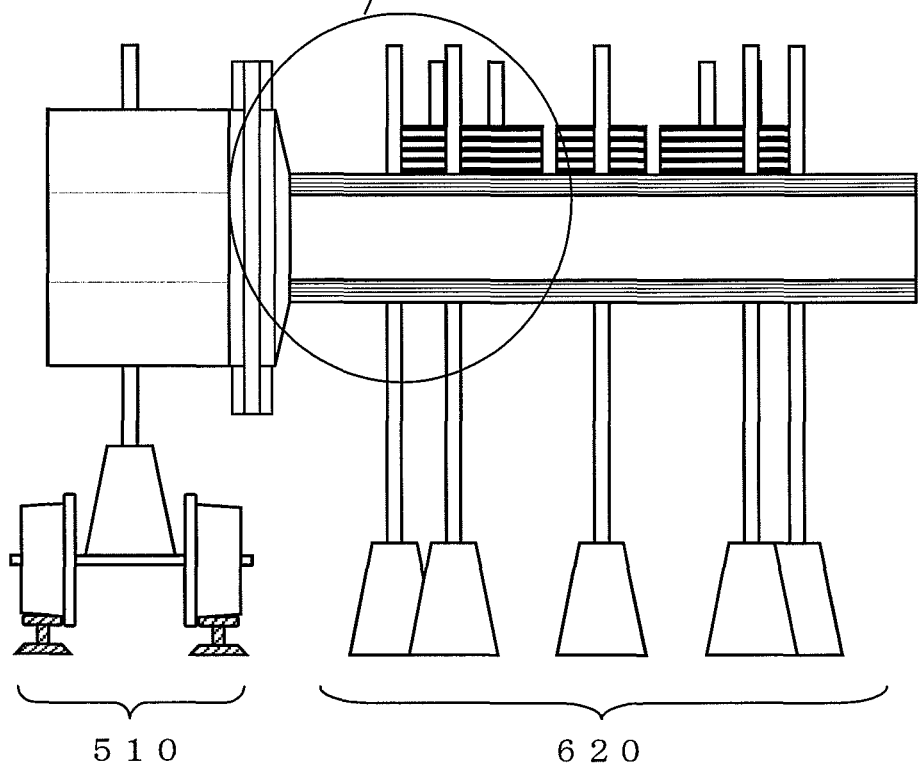
FIG. 32B shows a relationship between the thin sheet band coil table and the pillar unit used as the work environment in winding the thin sheet band around the giant spinning wheel composition, in which the thin sheet band coil table is movable and the pillar unit is stationary (though it can be finely adjusted).
Figure 33A:
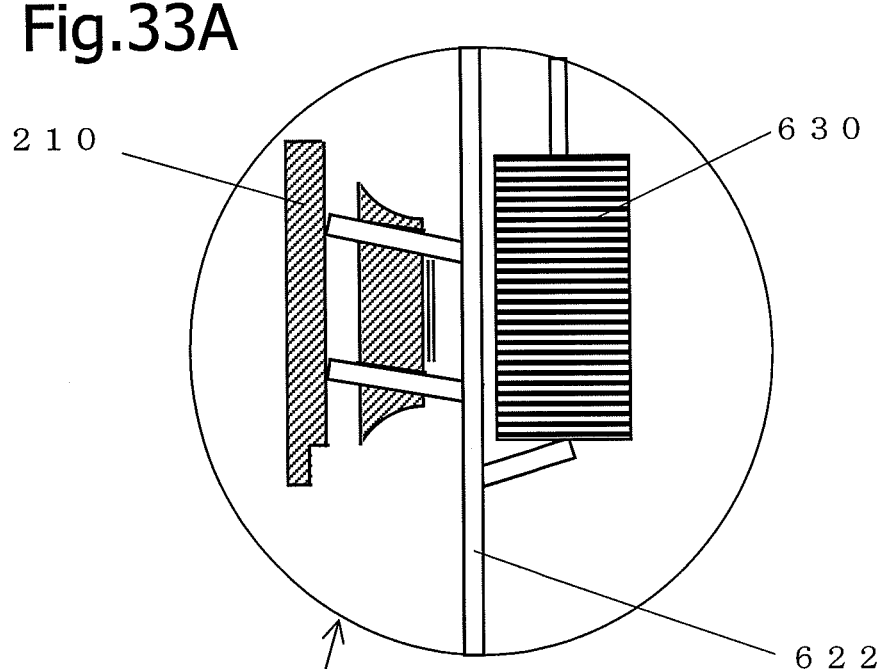
FIG. 33A is an enlarged section view showing a state of use of the pillar of the pillar unit used as the work environment in winding the thin sheet band for the shroud around the giant spinning wheel composition.
Figure 33B:
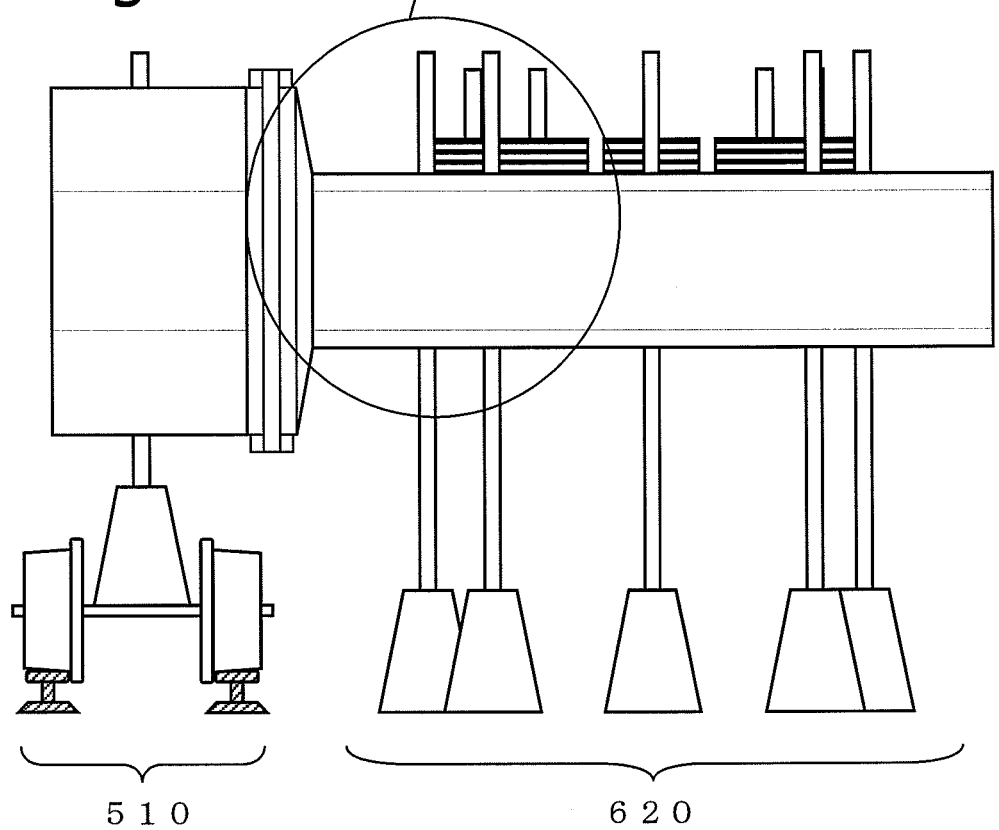
FIG. 33B shows a relationship between the thin sheet band coil table and the pillar unit used as the work environment in winding the thin sheet band around the giant spinning wheel composition, in which the thin sheet band coil table is movable and the pillar unit is stationary (though it can be finely adjusted).
Figure 34:
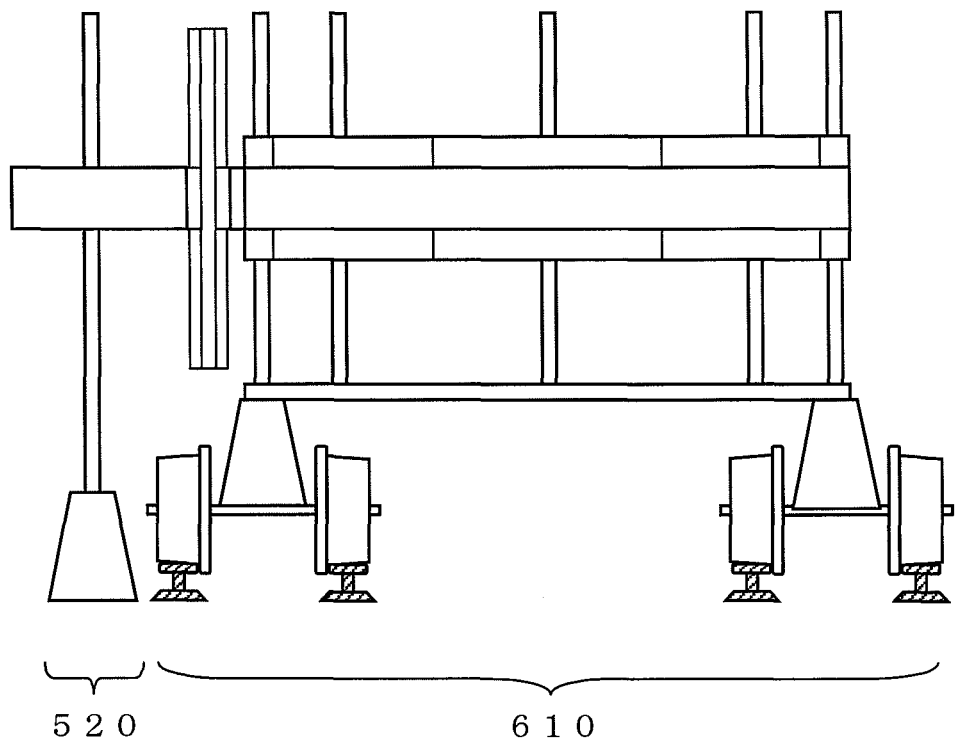
FIG. 34 shows a relationship between the thin sheet band coil table and the pillar unit used as the work environment in winding the thin sheet band around the giant spinning wheel composition, in which the thin sheet band coil table is stationary (though it can be finely adjusted) and the pillar unit is movable.
Figure 35:
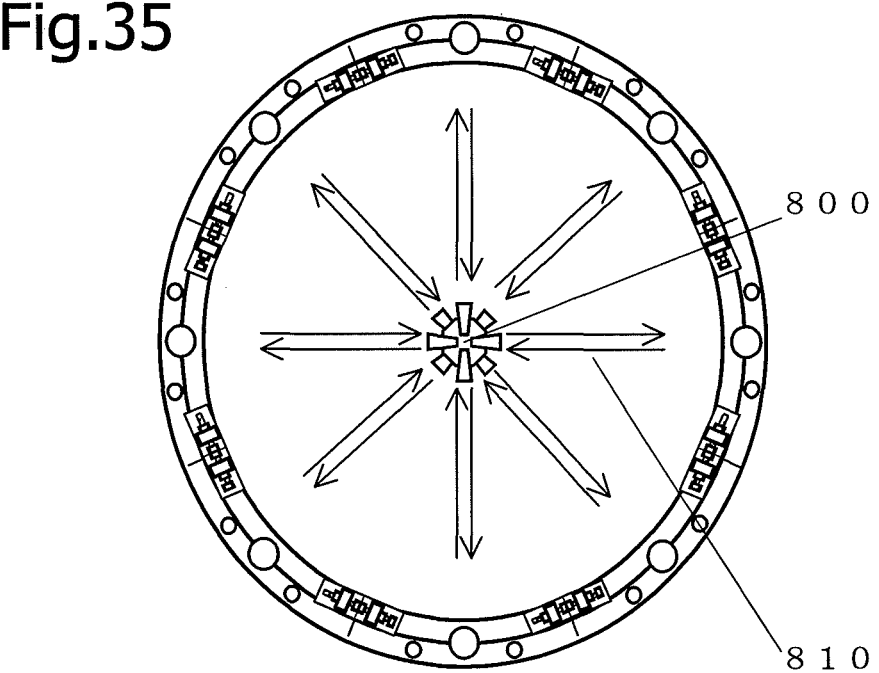
FIG. 35 is a plan view, seen from above, showing a state in which a light wave/laser distance measuring instrument is installed at the center of the giant spinning wheel composition to measure distances between the giant spinning wheel portions and the center of the giant spinning wheel composition. The more the thin sheet band is wound around the outer periphery of the giant spinning wheel composition, the more the giant spinning wheel composition is fastened and its diameter decreases. The decrease must be corrected by the coupling units and hence data for the correction is required. This method requires parts between the light wave/laser distance measuring instrument and the light wave/laser reflectors to be visual. Although this method may have a bottleneck in assuring the visual paths, it is advantageous in that this method permits to readily find whether or not the giant spinning wheel composition keeps true roundness.
Figure 36:
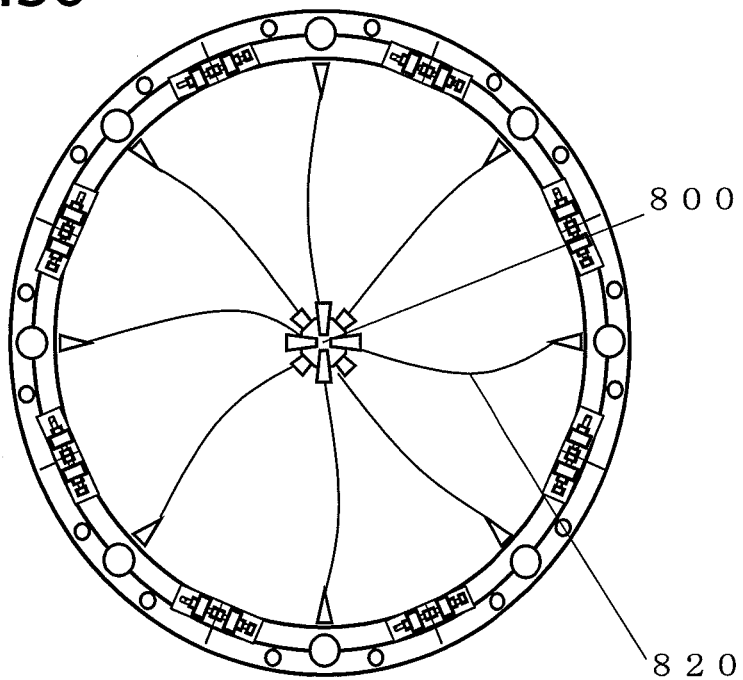
FIG. 36 is a plan view, seen from above, showing a state in which the light wave/laser distance measuring instrument is installed at the center of the giant spinning wheel composition and optical cables are laid to guide between the instrument and the giant spinning wheel portions to measure distances between the giant spinning wheel portions and the center of the giant spinning wheel composition. The more the thin sheet band is wound around the outer periphery of the giant spinning wheel composition, the more the giant spinning wheel composition is fastened and its diameter decreases. The decrease must be corrected by the coupling units and hence data for the correction is required. This method permits to measure the distances even if the parts between the light wave/laser distance measuring instrument and the light wave/laser reflectors are not visual.
Figure 37:
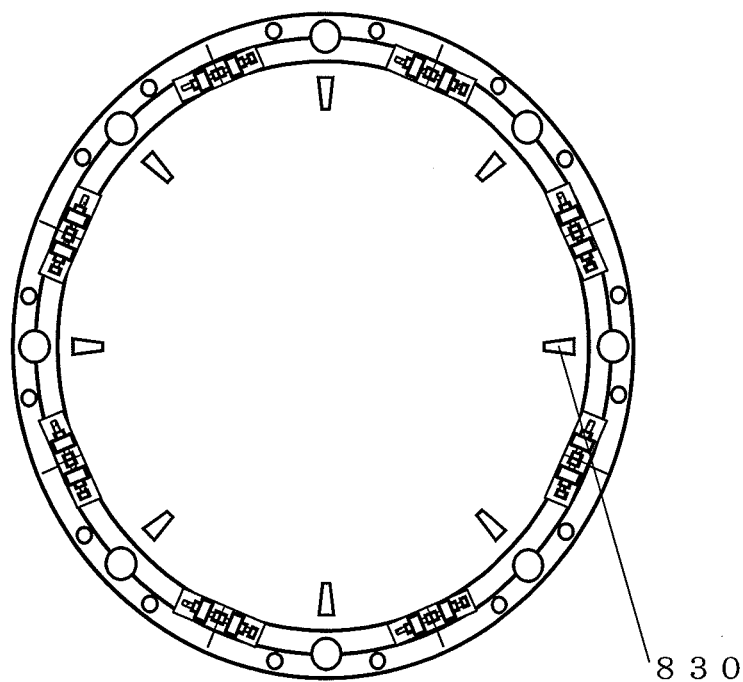
FIG. 37 is a plan view, seen from above, showing a state in which a plurality of precision distance measuring instruments are installed along the inner periphery of the giant spinning wheel composition to measure distances between the light wave/laser reflectors. The more the thin sheet band is wound around the outer periphery of the giant spinning wheel composition, the more the giant spinning wheel composition is fastened and its diameter decreases. The decrease must be corrected by the coupling units and hence data for the correction is required. Although the precision distance measuring instruments may be readily installed and no visual path needs to be assured, this method is unsuitable more or less to check whether or not the giant spinning wheel composition keeps the true roundness.
Figure 38A:
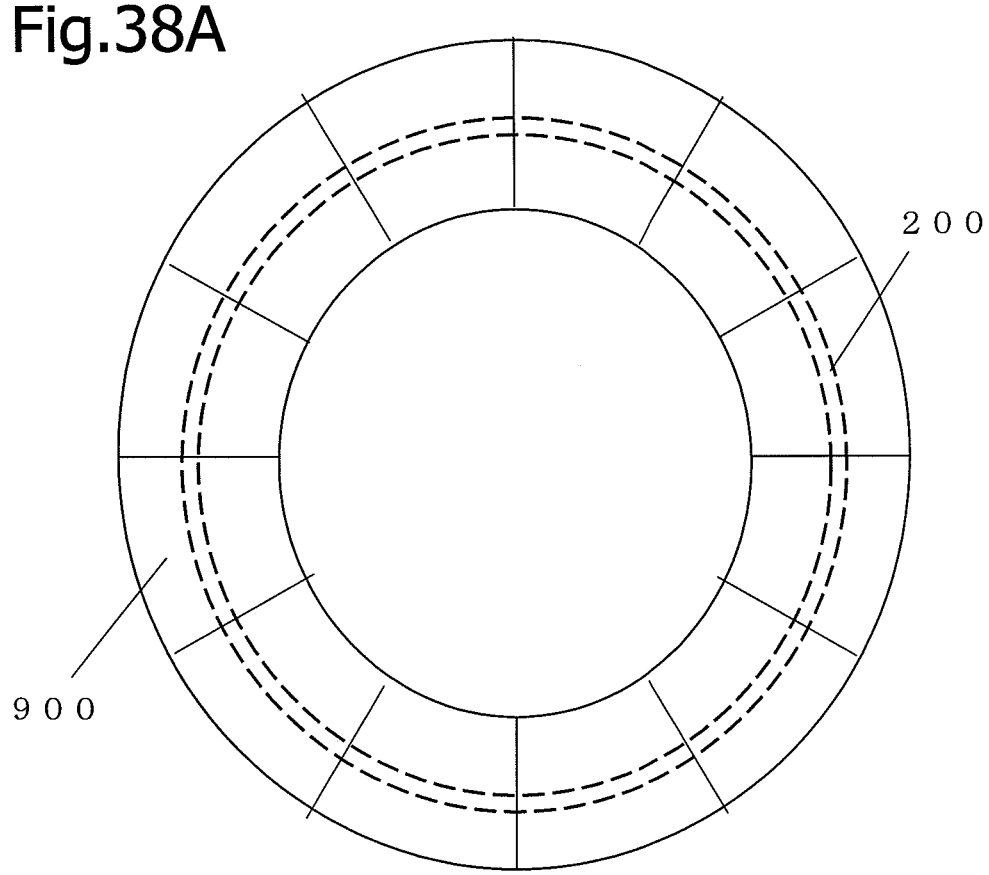
FIG. 38A is a plan view, seen from above, of a greenhouse as a work environment in which a donut-shaped giant spinning wheel composition having a large diameter may be stored and installed substantially at the center to keep temperature and humidity constant as the work environment because the long and thin sheet band elongates or contracts by temperature and humidity.
Figure 38B:
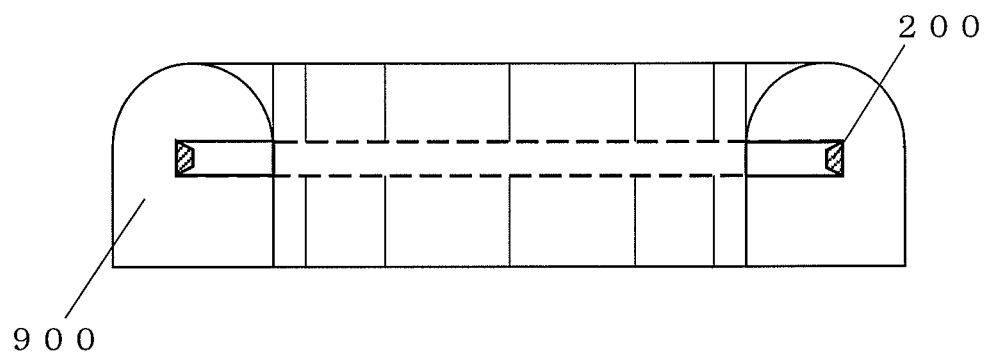
FIG. 38B is a partial section view, seen from the horizontal position, showing a state in which the giant spinning wheel composition is installed substantially at the center of the greenhouse having a single-layered structure. The greenhouse may have a double or triplex-layered or more multi-layered structure as necessary depending on correlation and others with the natural environment.

(10) Ring
(20) Rotatable duct
(30) Shroud
(50) Cylindrical external wall
(100) Thin sheet band
(101) Mesh-less thin sheet band
(102) Meshed thin sheet band
(121) Starting and ending point flap (which is a single type used at either a starting or an ending point)
(122) Starting and ending point flap (which works as a set of two flaps used at any points of starting, mid-way, and ending)
(123) Flap fixed adjustment section
(510) Thin sheet band coil table (movable system)
(520) Thin sheet band coil table (stationary system)
(610) Pillar unit (movable system)
(620) Pillar unit (stationary system)
(621) Pillar (for generating a ring)
(622) Pillar (for generating a rotatable duct or a shroud)
(630) Weight
(710) Ignition switch
(720) Electric wire for ignition
(730) Electric percussion cap
(740) Clayey explosive
(800) Light wave/laser distance measuring instrument
(810) Laser beam
(820) Optical cable
(830) Small precision distance measuring instrument (close-range)
(900) Greenhouse
(124) Flap overlap width section
(125) Flap electrode section
(130) Longitudinal plate portion
(200) Giant spinning wheel
(200a) Giant spinning wheel (outer side)
(200b) Giant spinning wheel (inner side)
(210) Giant spinning wheel portion
(210a) Giant spinning wheel portions (outer side)
(210b) Giant spinning wheel portion (inner side)
(211) Supporting hole (for generating a ring)
(212) Supporting hole (for generating a rotatable duct or a shroud)
(213) Flap retaining bolt hole (220) Coupling unit
(220*c*) Coupling unit (used in a closing direction)
(220*n*) Coupling unit (used under a neutral state)
(220*o*) Coupling unit (used in an opening direction)
(221) Bolt
(222) Nut
(230) Light wave/laser reflector
(300) Tension controller
(400) Shaping roller

The invention claimed is:

1. An apparatus for fabricating a ring, rotatable duct, shroud or cylindrical external wall, comprising:
   a plurality of giant spinning wheel portions that compose, when a whole number of the adjacent portions are coupled to each other, a giant spinning wheel which has the shape of a donut and whose diameter is about at least 2.7 meters for winding the thin sheet band being selected from at least one of 1) a first material being made of metal, ceramics, cermet, fiber or synthetic resin having a thickness from 0.01 mm to 5 mm, and 2) a second material being made of rubber or silicon having a thickness of 0.1 mm to 50 mm, around at least by two rounds, and laminating the selected thin sheet band to each other;
   each giant spinning wheel portion of the giant spinning wheel having a part of appearance side and a part of back side;
   the part of an appearance side having a circular arc shape and the part of a back side being provided with a reference plane or a reflector for measuring a distance by light wave or laser;
   the each giant spinning wheel portion further comprising at least two coupling units in total to assemble as the giant spinning wheel having at least either one of a bolt or a nut for coupling the plurality of the giant spinning wheel portions at both ends thereof in the adjacent direction; and
   an accurate distance measuring unit for accurately measuring a distance from the center of the giant spinning wheel to the giant spinning wheel portion, the diameter of the giant spinning wheel, by the light wave or laser during a period from beginning to end of the thin sheet band winding around the giant spinning wheel;
   wherein the apparatus is able to make the thin sheet band to be wound precisely around the giant spinning wheel while controlling the diameter of the giant spinning wheel by fastening or loosening the bolts and nuts of the coupling units of the giant spinning wheel portions based on the measured result of the distance from the center of the giant spinning wheel to the giant spinning wheel portions.

2. A method for fabricating a ring, rotatable duct, shroud or cylindrical external wall, comprising steps of;
   anchoring a starting point of a thin sheet band to a giant spinning wheel;
   winding the thin sheet band whose starting point is anchored to the giant spinning wheel around the giant spinning wheel by 2 rounds or more; and
   fixing between the laminated thin sheet bands by either one method of bonding the entire area between the laminated thin sheet bands to be wound, bonding by spots or bonding only starting and ending points;
   wherein said step of anchoring includes winding the thin sheet band being selected from at least one of 1) a first material being made of metal, ceramics, cermet, fiber or synthetic resin having a thickness from 0.01 mm to 5 mm, and 2) a second material being made of rubber or silicon having a thickness of 0.1 mm to 50 mm, around at least by two rounds, and laminating the selected thin sheet band to each other; and
   wherein said step of anchoring includes using the giant spinning wheel which has the shape of a donut and whose diameter is about at least 2.7 meters for winding the thin sheet band.

* * * * *